United States Patent
Sano et al.

(10) Patent No.: US 6,793,259 B2
(45) Date of Patent: Sep. 21, 2004

(54) ELECTRIC WIRE EXCESS LENGTH ABSORBING DEVICE AND SLIDING DOOR-USE POWER FEEDING APPARATUS USING THE SAME

(75) Inventors: Osamu Sano, Shizuoka (JP); Yasuhiro Suzuki, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 10/372,317

(22) Filed: Feb. 25, 2003

(65) Prior Publication Data

US 2003/0184118 A1 Oct. 2, 2003

(30) Foreign Application Priority Data

| Mar. 29, 2002 | (JP) | ................................... 2002-094937 |
| Mar. 29, 2002 | (JP) | ................................... 2002-094938 |
| Aug. 23, 2002 | (JP) | ................................... 2002-243969 |

(51) Int. Cl.[7] .............................. B60J 5/04; E05F 11/06
(52) U.S. Cl. ...................... 295/155; 296/208; 49/360; 49/502
(58) Field of Search .............................. 296/155, 208, 296/146.1, 37.13; 49/360, 502; 191/12.2 A

(56) References Cited

U.S. PATENT DOCUMENTS

| 5,453,585 | A | * | 9/1995 | Lenz et al. ............ 191/12.2 R |
| 6,241,063 | B1 | * | 6/2001 | Van Ess et al. ......... 191/12.2 A |
| 6,321,489 | B1 | * | 11/2001 | Murofushi et al. ........... 49/360 |
| 6,517,365 | B1 | * | 2/2003 | Bungo et al. ................ 439/162 |
| 2003/0164625 | A1 | * | 9/2003 | Dobson ...................... 296/155 |

FOREIGN PATENT DOCUMENTS

JP       2000-264136       9/2000

* cited by examiner

Primary Examiner—D. Glenn Dayoan
Assistant Examiner—Greg Blakenship
(74) Attorney, Agent, or Firm—Armstrong, Kratz, Quintos, Hanson & Brooks, LLP

(57) ABSTRACT

An electric wire excess length absorbing device has a casing, a reel pivotably provided in the casing for winding an electric wire, and an energizing member to energize the reel in a direction to wind the electric wire, which casing has an opening portion to lead out the electric wire. The casing may be formed long between a portion having the reel and the opening portion. A sliding door-use power feeding apparatus has an electric wire excess length absorbing device installed in a sliding door or on a vehicle body. A moving-side electric wire is arranged on one of the sliding door and the vehicle body, and a fixed-side electric wire 3b is arranged on the other of the sliding door and the vehicle body.

23 Claims, 17 Drawing Sheets

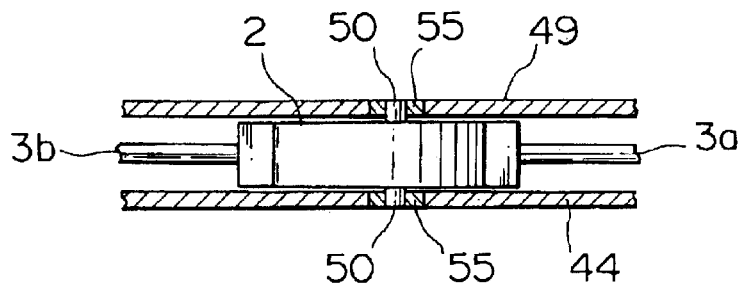
F I G. 17
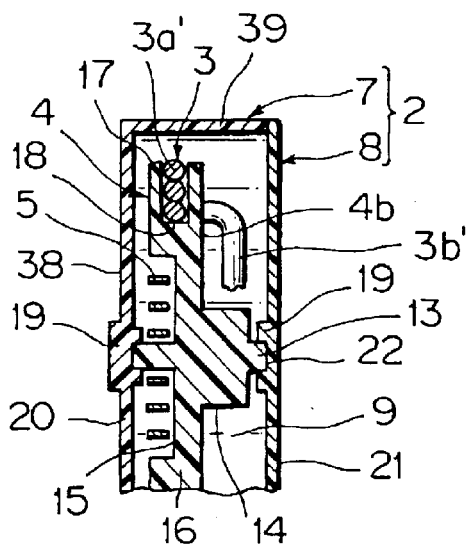
F I G. 20
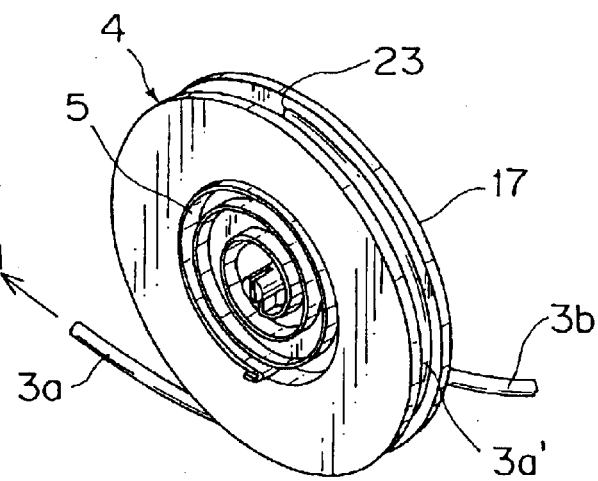
F I G. 21
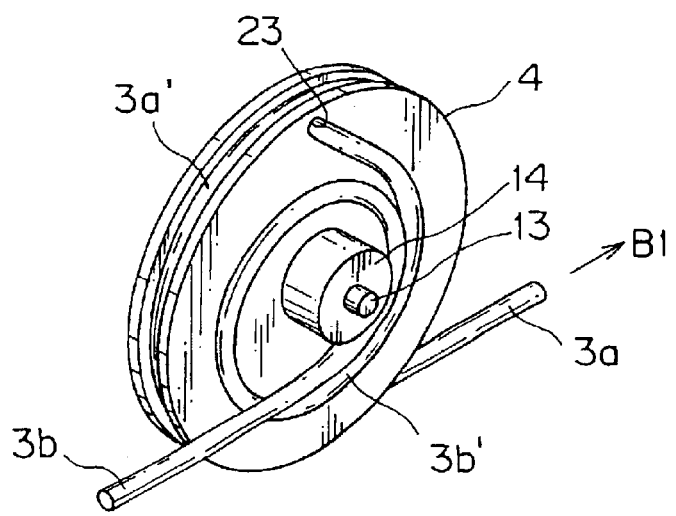
F I G. 22

ELECTRIC WIRE EXCESS LENGTH ABSORBING DEVICE AND SLIDING DOOR-USE POWER FEEDING APPARATUS USING THE SAME

BACKGROUND OF THE INVENTION

1. Field of the Invention

The present invention relates to an electric wire excess length absorbing device to absorb a slack of an electric wire by winding the electric wire on a reel and a sliding door-use power feeding apparatus, of a motor vehicle, using the electric wire excess length absorbing device.

2. Description of the Related Art

An electric wire excess length absorbing device shown in FIG. 42 (Japanese Patent Application Laid-open No. 2000-264136) has been suggested as one of the electric wire excess length absorbing device which releases or retracts an electric wire according to an opening-and-closing of a sliding door of a one-box car or the like.

This electric wire excess length absorbing device 71 has a pair of link arms 72, a slider 73 connected to an end of one of the link arms 72, and a guide rail 74 to which an end of the other of the link arms 72 is connected and with which the slider 73 slidably engages.

The electric wire excess length absorbing device 71 is arranged on a sliding door 75. The guide rail 74 is horizontally fixed to a door panel 76 made of metal. The pair of link arms 72 is openable-and-closable between the door panel 76 and a door trim (not shown) made of synthetic resin.

A wiring harness (electric wires) 77 is arranged along the pair of link arms 72 and fixed to the slider 73. One end of the wiring harness 77 curves large from the slider 73 to a step portion 79 of a vehicle body 78 and is connected to a wiring harness 80 on a vehicle body side by means of a connector. The other end of the wiring harness 77 is arranged on the sliding door 75 from the end of the link arms 72 and connected to the auxiliaries such as electric appliances equipped on the sliding door.

The power feeding from the vehicle body side (the battery side) to the auxiliaries on the sliding door is done by this sliding door-use power feeding apparatus. That is, the power current or the signal current is supplied to the auxiliaries regardless of the opening-and-closing of the sliding door 75. The auxiliaries include a powerwindow motor, a door lock unit, a switch unit or an automatic door opening-and-closing unit for example.

While the sliding door 75 is being closed by forwardly sliding it in the arrow G1 direction, the pair of link arms 72 opens, and the slider 73 moves toward the rear of the guide rail 74. On the contrary, while the sliding door 75 is being opened, the pair of link arms 72 closes, and the slider 73 moves toward the front of the guide rail 74.

With respect to the above prior art's electric wire excess length absorbing device 71, however, the long guide rail 74 and the pair of link arms 72 make the structure and the weight large. Therefore, the arrangement of parts inside the sliding door is limited in order to prevent the interference of the link arms 72 with the parts. The length of the guide rail 74 or the link arms 72 often has to be changed according to the type of a motor vehicle, which requires a lot of man-hours for the design and manufacturing, thereby increasing the cost.

SUMMARY OF THE INVENTION

In view of the foregoing, an object of the present invention is to provide an electric wire excess length absorbing device, which is simple and compact, has a versatility, and can smoothly securely absorb a slack of an electric wire, and a sliding door-use power feeding apparatus using the above electric wire excess length absorbing device.

In order to achieve the above object, as a first aspect of the present invention, an electric wire excess length absorbing device, comprising: a casing having an electric wire leading-out portion; a reel pivotably provided in the casing for winding an electric wire; and an energizing member to energize the reel in a direction of winding the electric wire, wherein the casing is pivotably supported by an installing portion.

As a second aspect of the present invention, based on the first aspect, a rotary shaft is provided on the casing, and a receiving portion for the rotary shaft is provided on the installing portion.

As a third aspect of the present invention, based on the first aspect, a rotation center of the reel and a rotation center of the casing are aligned.

As a fourth aspect of the present invention, based on the first aspect, a loosely winding portion to loosely winding a fixed-side electric wire of the electric wire is provided on the reel.

As a fifth aspect of the present invention, based on the first aspect, a contact terminal is provided on one of the reel and the casing, an annular circuit conductor for the contact terminal is provided the other of the reel and the casing, a moving-side electric wire is connected to one of the contact terminal and the circuit conductor, and a fixed-side electric wire is connected to the other of the contact terminal and the circuit conductor.

As a sixth aspect of the present invention, a sliding door-use power feeding apparatus is characterized in that the electric wire excess length absorbing device set forth in any one of claims 1–5 is pivotably arrange on one of the sliding door and the vehicle body, the electric wire or the moving-side electric wire is arranged on the other of the sliding door and the vehicle body, and the fixed-side electric wire is arranged on the one of the sliding door and the vehicle body.

As a seventh aspect of the present invention, based on the sixth aspect, the electric wire excess length absorbing device is laterally arranged, and the electric wire is led out of the electric wire leading-out portion substantially horizontally.

As an eighth aspect of the present invention, an electric wire excess length absorbing device comprises: a casing; a reel pivotably provided in the casing for winding an electric wire; and an energizing member to energize the reel in a direction of winding the electric wire, wherein the casing is provided with an opening portion, being long, enabling the electric wire to be swingably led out thereof.

As a ninth aspect of the present invention, based on the eighth aspect, the opening portion is formed long over a width of the casing long.

As a tenth aspect of the present invention, based on the eighth aspect, an electric wire guide wall, being curved, is formed along an edge of the opening portion.

As an eleventh aspect of the present invention, based on the eighth aspect, the casing is formed long between the reel and the opening portions.

As a twelfth aspect of the present invention, based on the eighth aspect, the opening portion faces a radial direction of the reel, and a reel rotation absorbing portion is positioned adjoining to the reel in an axial direction of the reel.

As a thirteenth aspect of the present invention, based on the twelfth aspect, a loosely winding portion, to loosely wind a fixed-side electric wire continuing from the electric wire, is provided as the reel rotation absorbing portion, and a portion to lead out the fixed-side electric wire is provided on the casing.

As a fourteenth aspect of the present invention, based on the twelfth aspect, a contact terminal is provided on one of the reel and the casing, an annular circuit conductor for the contact terminal is provided the other of the reel and the casing, a moving-side electric wire is connected to one of the contact terminal and the circuit conductor, and a fixed-side electric wire is connected to the other of the contact terminal and the circuit conductor, whereby the reel rotation absorbing portion is constituted.

As a fifteenth aspect of the present invention, a sliding door-use power feeding apparatus is characterized in that the electric wire excess length absorbing device set forth in any one of claims 8–14 is arrange on one of the sliding door and the vehicle body, the electric wire or the moving-side electric wire is arranged on the other of the sliding door and the vehicle body, and the fixed-side electric wire is arranged on the one of the sliding door and the vehicle body.

As a sixteenth aspect of the present invention, based on the fifteenth aspect, the electric wire excess length absorbing device is laterally arranged such that the opening portion of the casing faces one of the vehicle body and the sliding door.

As a seventeenth aspect of the present invention, a sliding door-use power feeding apparatus comprises: an electric wire excess length absorbing device comprises: a casing having an opening portion for leading out an electric wire; a reel pivotably provided in the casing for winding the electric wire; and an energizing member to energize the reel in a direction of winding the electric wire, wherein the electric wire excess length absorbing device is arranged on one of a sliding door and a vehicle body, a moving-side electric wire is arranged on the other of the sliding door and the vehicle body, and a fixed-side electric wire is arranged on the one of the sliding door and the vehicle body.

According to the above-described structures of the present invention, the following advantages are provided.

(1) Since the casing turns when the electric wire is drawn out or wound up, the electric wire is drawn out of the casing almost straightly and wound up almost straightly inside the casing. The drawing and the winding of the electric wire are securely carried out, an excessive bending force and torsional force do not act on the electric wire, thereby elongating the life. The structure is simple and compact, a space saving is attained. Since the winding length of the electric wire can be set long, the device is versatile. Since the electric wire leading-out portion of the casing is narrow, water or dust is not likely to enter the casing.

(2) The casing is pivotable on the installing portion by an engagement of the rotary shaft and the receiving portion. The rotary shaft can easily be formed integrally with the casing by the molding, which reduces the parts cost.

(3) Since the casing turns smoothly, the drawing and the winding of the electric wire can be securely carried out.

(4) Since the loosely wound portion of the electric wire is provided, the reel can smoothly rotate.

(5) Since the contact terminal slides on the circuit conductor, the reel can smoothly rotate.

(6) Since the casing of the electric wire excess length absorbing device turns according to the movement of the electric wire, the electric wire is drawn out of the casing almost straightly and pulled toward the casing almost straightly. Therefore, deformation or breakage of the electric wire is prevented.

(7) Since the electric wire is not bent strongly, the drawing or the winding of the electric wire can be carried out more smoothly. The electric wire excess length absorbing device can be easily installed laterally on the vehicle body.

(8) Since the drawing or the winding of the electric wire can be done three-dimensionally along the long opening portion of the casing, a slack absorption of the electric wire can be done securely and smoothly. Since the structure is simple and compact, the electric wire excess length absorbing device can be easily installed in a narrow space.

(9) Since the moving or swinging range of the electric wire is widened, the multiusability can be improved.

(10) Since the electric wire can smoothly move or swing along the electric wire guide wall, wear, damage or deformation of the electric wire can be prevented.

(11) Since the position of the electric wire winding portion including the reel can be adjusted, the multiusability of the electric wire excess length absorbing device can be improved.

(12) Since the electric wire drawn out of the reel is directly led to the opening portion, wear of the electric wire can be prevented, and the drawing or the winding of the electric wire can be done smoothly.

(13) Since the winding diameter of the loosely wound portion of the fixed-side electric wire is reduced, the reel can smoothly rotate.

(14) Since the contact terminal slides on the circuit conductor, the reel can smoothly rotate.

(15) Since the drawing or the winding of the electric wire can be done three-dimensionally along the long opening portion of the casing, a sandwiching of the electric wire between the sliding door and the vehicle body can be securely prevented. Since the compact electric wire excess length absorbing device can be easily securely installed in a narrow space of the sliding door or of the vehicle body, an interference with another structure can be securely prevented.

(16) Since the electric wire is almost horizontally led out from the opening portion of the casing, a torsional force does not act on the electric wire. Therefore, the drawing or the winding of the electric wire can be done more smoothly and securely.

(17) Since the drawing or the winding of the electric wire can be done three-dimensionally along the long opening portion of the casing, a slack absorption of the electric wire can be done securely and smoothly. Reliability for the power supply to the auxiliaries can be improved. Since the structure is simple and compact, the electric wire excess length absorbing device can be easily installed in a narrow space. The degree of freedom for layout of structural parts can be improved.

The above and other objects and features of the present invention will become more apparent from the following description taken in conjunction with the accompanying drawings.

BRIEF DESCRIPTION OF THE DRAWINGS

FIG. 17 is a partly sectional side view showing an attaching state of the electric wire excess length absorbing device.

FIG. 20 is an A1—A1 sectional view of FIG. 19.

FIG. 21 is a perspective view showing a reel of the electric wire excess length absorbing device.

FIG. 22 is a perspective view showing a reverse side of the reel of FIG. 21.

DESCRIPTION OF THE PREFERRED EMBODIMENT(S)

Figure 1:
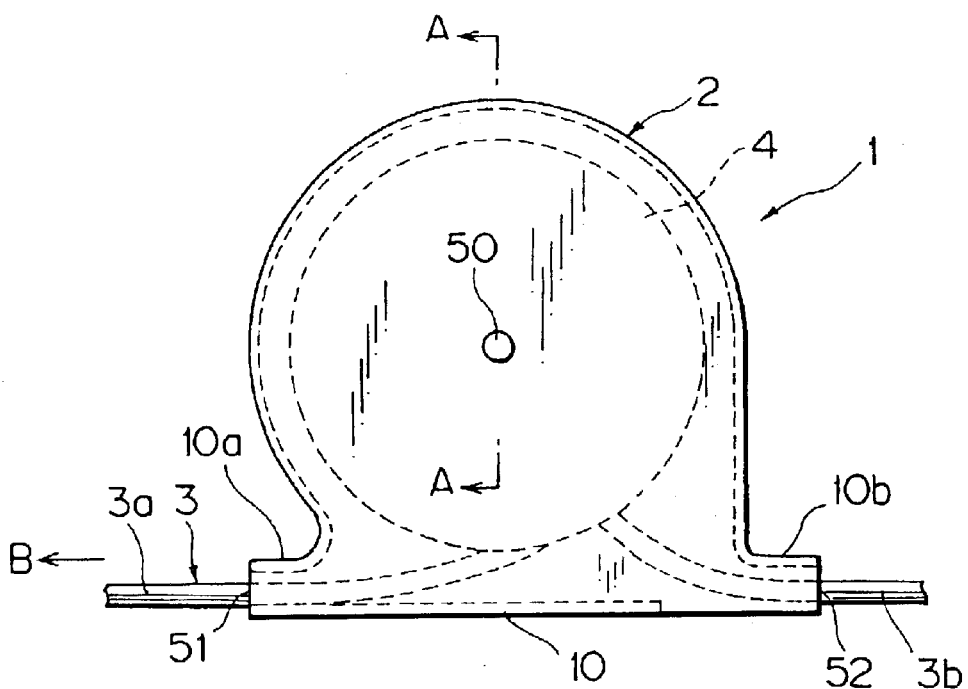
FIG. 1 is a front view showing the first embodiment of the inventive electric wire excess length absorbing device.

Embodiment(s) of the present invention will now be described in further detail with reference to the accompanying drawings.

FIG. 1–FIG. 5 show the first embodiment of the inventive electric wire excess length absorbing device.

The electric wire excess length absorbing device 1 has a generally cylindrical casing 2 made of synthetic resin, a generally disc-shaped reel 4 made of synthetic resin and pivotably provided in the casing 2 to wind a wiring harness (electric wires) 3, and a spiral spring 5 (FIG. 2, FIG. 4) made of metal to energize the reel 4 in one rotary direction. A rotary shaft 50 projects from each side of the casing 2.

The casing 2 is pivotable on the rotary shafts 50. The casing 2 consists of a first casing body 7 and a second casing body 8 (FIG. 2) and has a reel accommodating portion 9 and a harness leading-out portion 10 (FIG. 1) in a tangential direction of the reel accommodating portion 9. The casing body 7 has a base plate portion 38 and a peripheral wall 39, and the casing body 8 has a base plate portion 21. Both the base plate portions 21,38 are in parallel with each other. The casing bodies 7,8 are fixed to each other with a non-shown male screw or an engaging means.

The rotary shaft 50 orthogonally projects from each of the base plate portions 21,38 almost at the center thereof. The rotary shaft 50 may be formed of synthetic resin integrally with the casing 2, or the rotary shaft 50 made of metal may be pivotably attached, or fixed, to each of the base plate portions 21,38 of the casing 2. The center of the rotary shaft 50 and the center of the reel 4 are aligned with each other.

Figure 3:
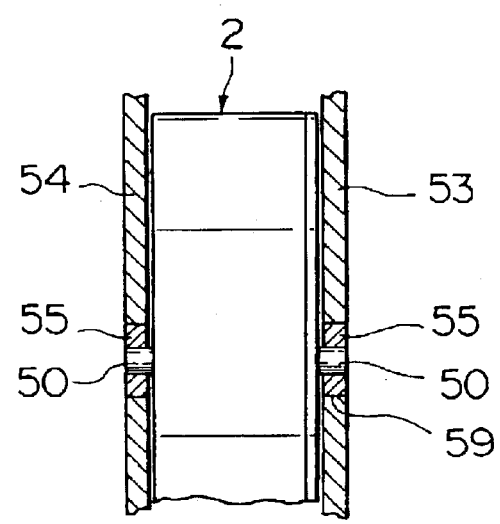
FIG. 3 is a partly sectional side view showing an attaching state of the electric wire excess length absorbing device.
Figure 4:
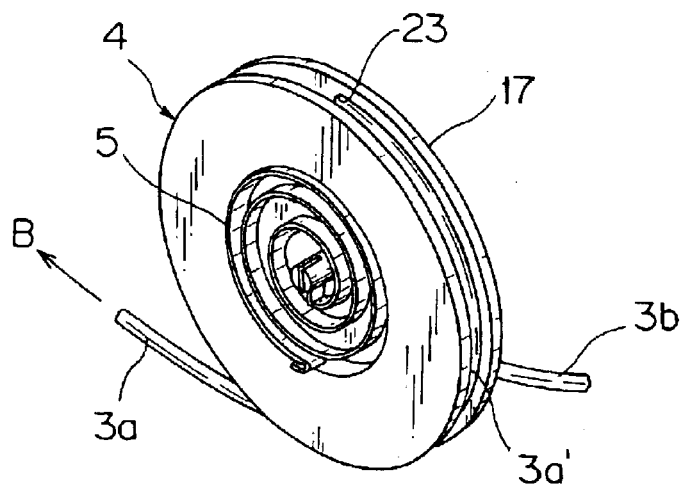
FIG. 4 is a perspective view showing a reel of the electric wire excess length absorbing device.
Figure 5:
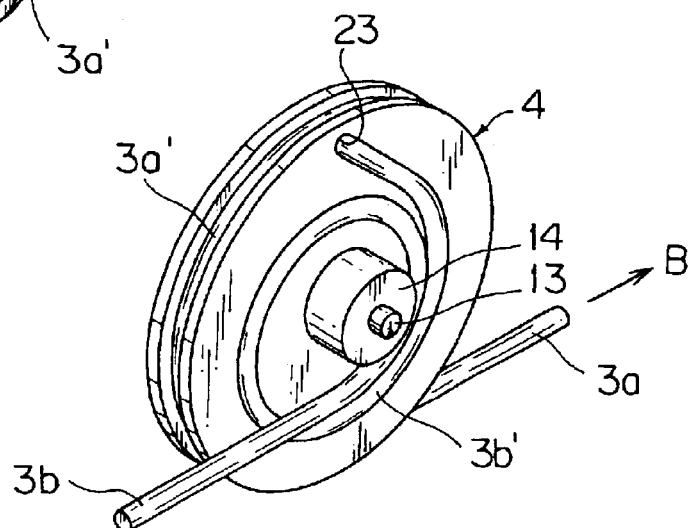
FIG. 5 is a perspective view showing a reverse side of the reel of FIG. 4.

Referring to FIG. 3, the pair of rotary shafts 50 are supported by respective wall portions 53,54 of an installing portion. The wall portions 53,54 of the installing portion are positioned in parallel with each other and pivotably support the rotary shafts 50 through, for example, bearings (receiving portion) 55. The bearing 55 is received in an opening portion 59 of each of the wall portions 53,54. A ball bearing, a dry bearing or the like can be used as the bearing 55. It is preferable that a small gap is provided between the casing 2 and the wall portions 53,54 in order to smoothly rotate the casing 2. The diameter of each of the rotary shaft 50 may be different.

The harness leading-out portion 10 of the casing 2 has opening portions (electric wire leading-out portions) 51,52 as shown in FIG. 1. One opening portion 51 is rectangularly formed. The opening portions 51,52 are formed at respective tubular portions 10a, 10b of the harness leading-out portion 10. The tubular portions 10a, 10b may be eliminated.

A moving-side wiring harness (electric wire) 3a of the wiring harness 3 in the casing 2 is forwardly led out of the opening portion 51 as shown by the arrow B. A fixed-side wiring harness 3b of the wiring harness 2 is rearwardly led out of the opening portion 52. The fixed-side wiring harness 3b may be fixed to the casing 2 with a fixing means (not shown) such as a tape or a band near the opening portion 52.

The wiring harness 3 is formed by covering a plurality of electric wires with a net-like tube, a corrugate tube made of synthetic resin, or vinyl tape. The wiring harness 3 can be formed with a single electric wire.

Figure 2:
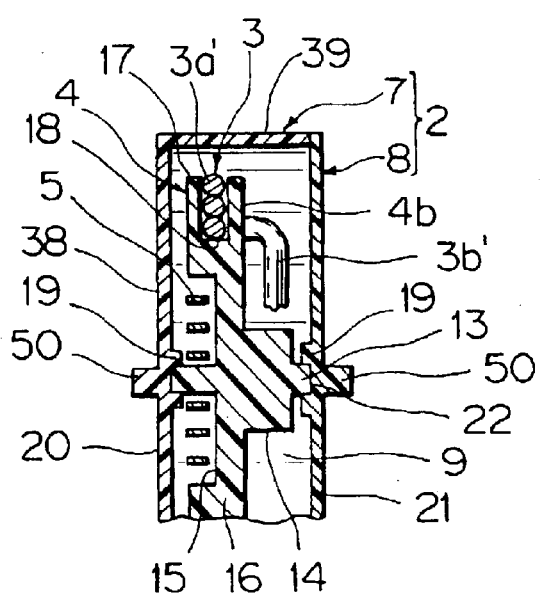
FIG. 2 is an A—A sectional view of FIG. 1.

Referring to FIG. 2, the reel 4 has a small-diameter shank 13, a boss portion 14 continuing from the shank 13, a recess 15 positioned opposite to the shank 13, and a reel body 16. The reel body 16 has two disc portions 17 and an annular groove portion 18 formed between the disc portions 17. The reel 4 can be integrally molded of synthetic resin.

End portions of the respective shanks 13 pivotably engage the receiving portions 19 of the casing bodies 7,8. Each receiving portion 19 consists of an annular portion and a hole portion 22 inside the annular portion. The shank 13 enters the hole portion 22. A spiral spring 5 is arranged in the recess 15 of the reel 4, one end of the spiral spring 5 is fixed to the shank 13, and the other end of the spiral spring 5 is fixed to the casing body 7.

The wiring harness 3 is wound inside the groove portion 18 of the reel 4, and the moving-side wiring harness 3a of the wiring harness 3 is led out of the casing 2 from the opening portion 51. The reel 4 is energized by the spiral spring 5 in a winding direction of the wiring harness 3.

The wiring harness 3 goes through a small hole 23 (FIG. 4) of the disc portion 17, is loosely wound on the boss portion 14 along a side surface 4b of the reel 4, and is led out of the opening portion 52 (FIG. 1) of the casing 2. The winding direction of the fixed-side wiring harness 3b is opposite to that of the moving-side wiring harness 3a (3a', FIG. 2). A loosely wound portion 3b' of the wiring harness 3b allows the turning or rotation of the reel 4 when the moving-side wiring harness 3a is pulled out.

Here, in place of the spiral spring 5, a coil spring (not shown) may be arranged in a radial direction of the reel 4 when the maximum turning angle of the reel 4 is small.

FIG. 6–FIG. 9 show the second embodiment of the inventive electric wire excess length absorbing device. In this electric wire excess length absorbing device 28, the loosely wound portion 3b' (FIG. 5) of the previous embodiment is replaced with a contact terminal 25 and an annular circuit conductor 26, which allow the rotation of a reel 27. Since the structure except the contact terminal 25 and the annular circuit conductor 26 is similar to the previous embodiment, the same reference characters are used and detailed description is omitted.

Figure 8:
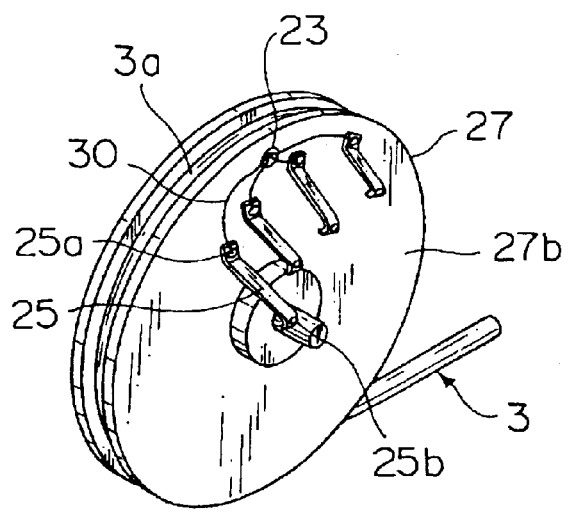
FIG. 8 is a perspective view showing a reel.

A plurality of contact terminals 25 are provided on a side surface 27b of the reel 27 as shown in FIG. 8, one ends 25a of the contact terminals 25 are connected to the respective electric wires 30 of the moving-side wiring harness 3a. The boss portion 14 (FIG. 2) of the previous embodiment is not necessary on the reel 27. The wiring harness 3 consists of four electric wires 30 in the present embodiment. Each contact terminal 25 connected to the electric wire 30 by means of the soldering, the crimping or the like is fixed to the reel 27. Each contact terminal 25 has an elasticity and has a contact 25b for a circuit conductor 26.

Figure 9:
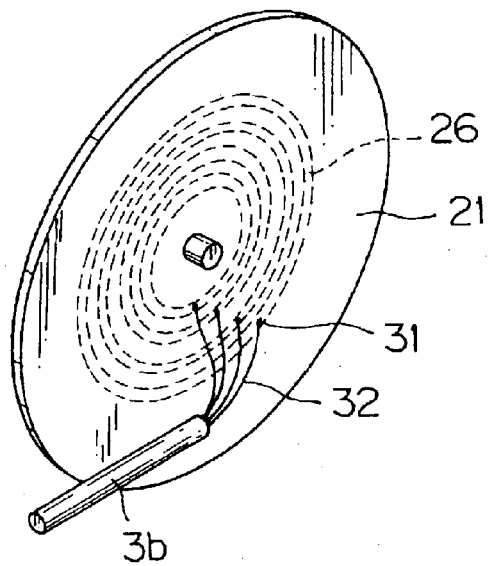
FIG. 9 is a perspective view showing an outside portion of a casing of the electric wire excess length absorbing device.

Referring to FIG. 9, the circuit conductors 26 are concentrically annularly provided on an inner surface of the base plate portion 21 of the casing 2. Each circuit conductor 26 is connected to a fixed-side terminal portion 31 (FIG. 6) through the base plate portion 21 of the casing 2, and an electric wire 32 (FIG. 6, FIG. 9) of the fixed-side wiring harness 3b is connected to the terminal portion 31 by means of the soldering or the crimping.

Figure 7:
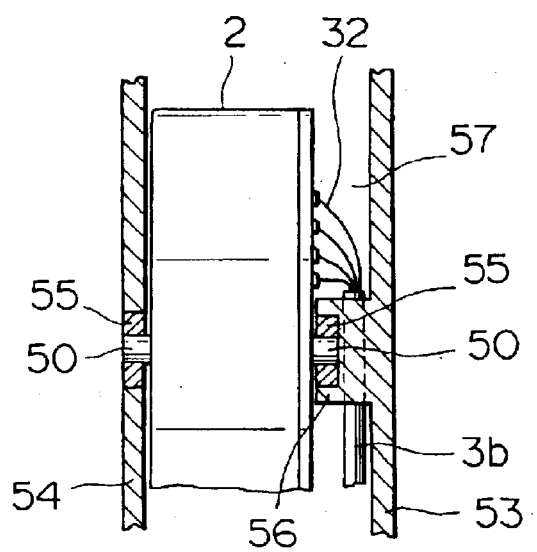
FIG. 7 is a partly sectional side view showing an attaching state of the electric wire excess length absorbing device.

As shown in FIG. 7, one rotary shaft 50 of the casing 2 is pivotally supported by a boss portion 56 of a wall portion 53 of an installing portion through a bearing 55. Some gap 57 is formed between the casing 2 and the wall portion 53 due to the thickness of the boss portion 56. The fixed-side wiring harness 3b is arranged between the gap 57. The other rotary shaft 50 is pivotally supported by another wall portion 54 through the bearing 55. A small gap is provided between the wall portion 54 and the casing 2.

A moving-side wiring harness 3a is wound inside a groove portion 18 (FIG. 6) of the reel 27, and one end side of the wiring harness 3a is led out of the opening portion 51 (FIG. 1) of the casing 2, and the other end side is put through a small hole 23 (FIG. 8) of the reel 27 and connected to the contact terminal 25.

Figure 6:
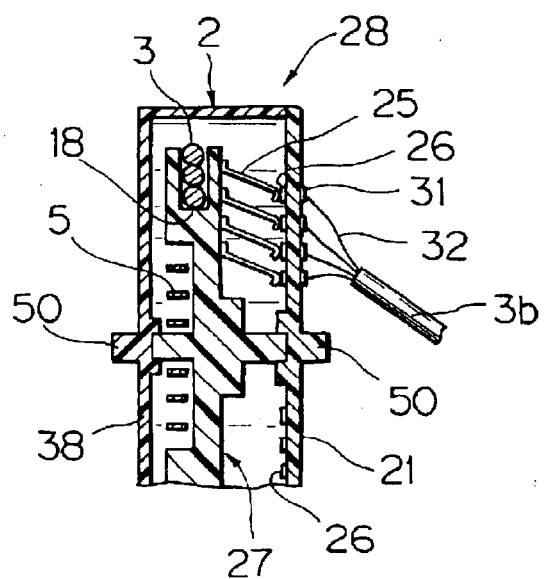
FIG. 6 is a longitudinal sectional view showing the second embodiment of the electric wire excess length absorbing device.

Here, referring to FIG. 6, the contact terminals 25 may be provided on the base plate portion 21 of the casing 2, the annular circuit conductors 26 may be provided on the side surface 27b (FIG. 8) of the reel 27, the moving-side wiring harness 3a may be connected to the circuit conductors 26. In this case, the fixed-side wiring harness 3b is connected to the proximal end portions of the contact terminals 25 put through the base plate portion 21 of the casing 2.

Figure 10:
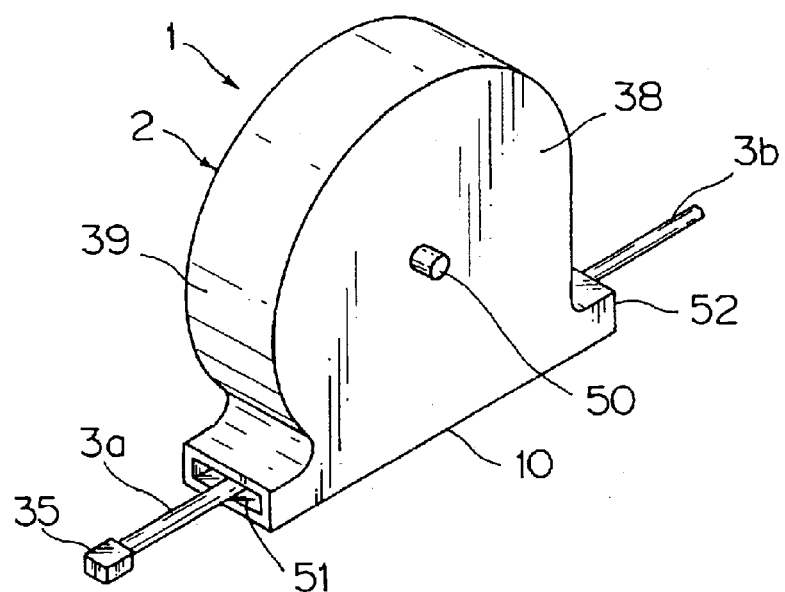
FIG. 10 is a perspective view showing the first embodiment of the electric wire excess length absorbing device for explaining an action thereof hereinafter.

The action of the electric wire excess length absorbing device 1 of the above first embodiment will be described below with reference to FIG. 10–FIG. 13. As shown in FIG. 10, the moving-side wiring harness 3a led out of the opening portion 51 of the casing 2 is connected to a mating wiring harness 36 (FIG. 11) with a connector 35.

Figure 11:
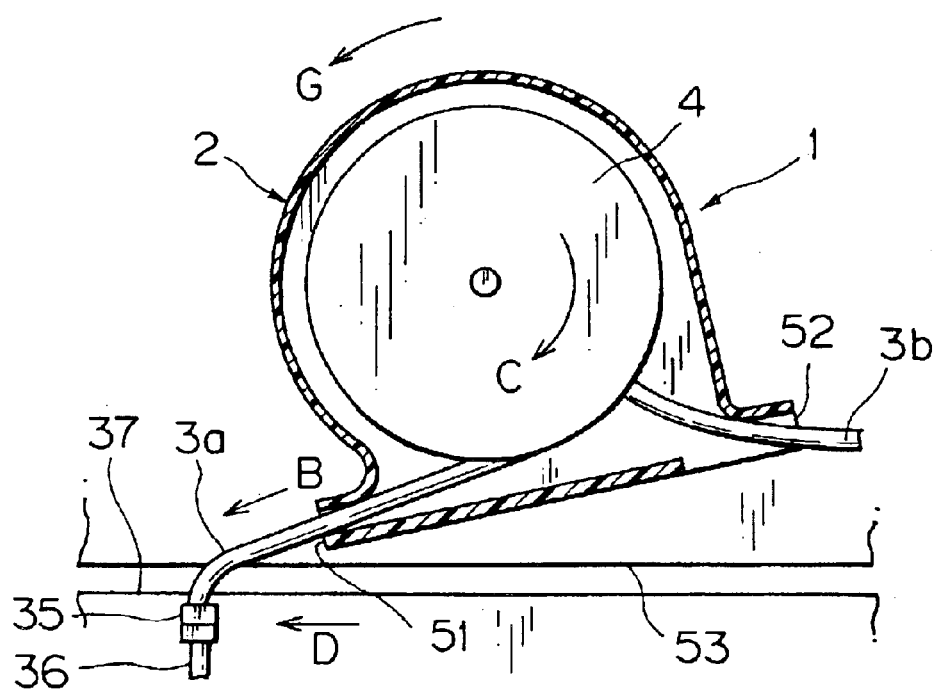
FIG. 11 is an explanatory illustration showing an action (drawing of an electric wire) of the electric wire excess length absorbing device of FIG. 10.

Referring to FIG. 11, when the mating connecting portion side 37 moves in the arrow D direction with respect to the electric wire excess length absorbing device 1, the wiring harness 3a is drawn out of the casing 2 as shown by the arrow B against the force of the spiral spring 5 (FIG. 2), the reel 4 turns as shown by the arrow C, and simultaneously the casing 2 turns as shown by the arrow G in a direction opposite to that of the reel 4.

When the reel 4 is turned, the winding diameter of the loosely wound portion 3b' (FIG. 5) reduces. (The contact terminals 25 of FIG. 6 move integrally with the reel 27 along the circuit conductors 26.) Here, FIG. 11 illustrates correspondingly to the embodiment of FIG. 2.

Figure 12:
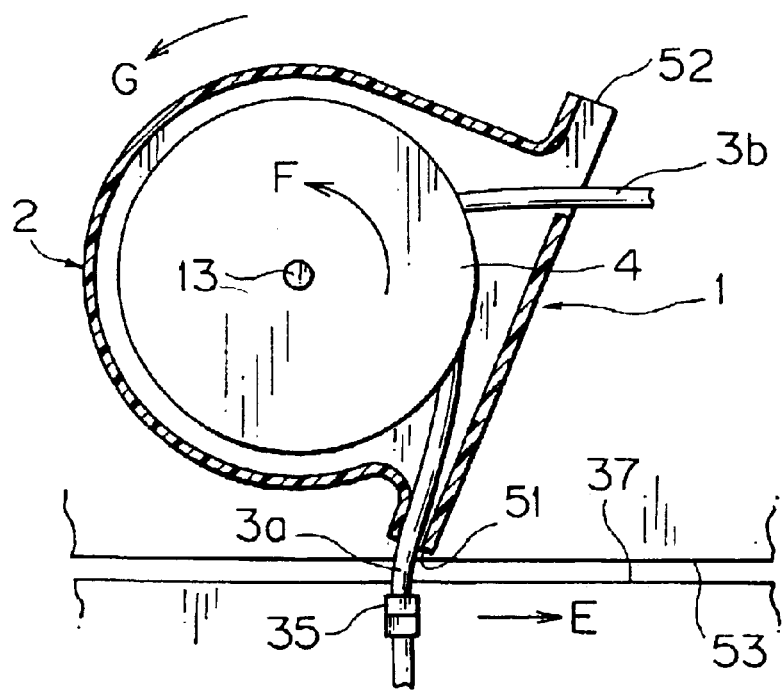
FIG. 12 is an explanatory illustration showing an action (winding the electric wire) of the electric wire excess length absorbing device of FIG. 10.

Referring to FIG. 12, when the mating connecting portion side 37 moves in the arrow E direction with respect to the electric wire excess length absorbing device 1, the wiring harness 3a moves in the arrow E direction about the reel shank 13 and the wiring harness 3a is wound up by the reel 4. The reel 4 turns in the arrow F direction by virtue of the spiral spring 5 (FIG. 2) so as to wind up the wiring harness 3a. By this, the slack, i.e. the excess length, of the wiring harness 3a is absorbed. The fixed-side wiring harness 3b is led out of the opening portion 52. The leading-out direction of the fixed-side wiring harness 3b is almost constant.

Figure 13:
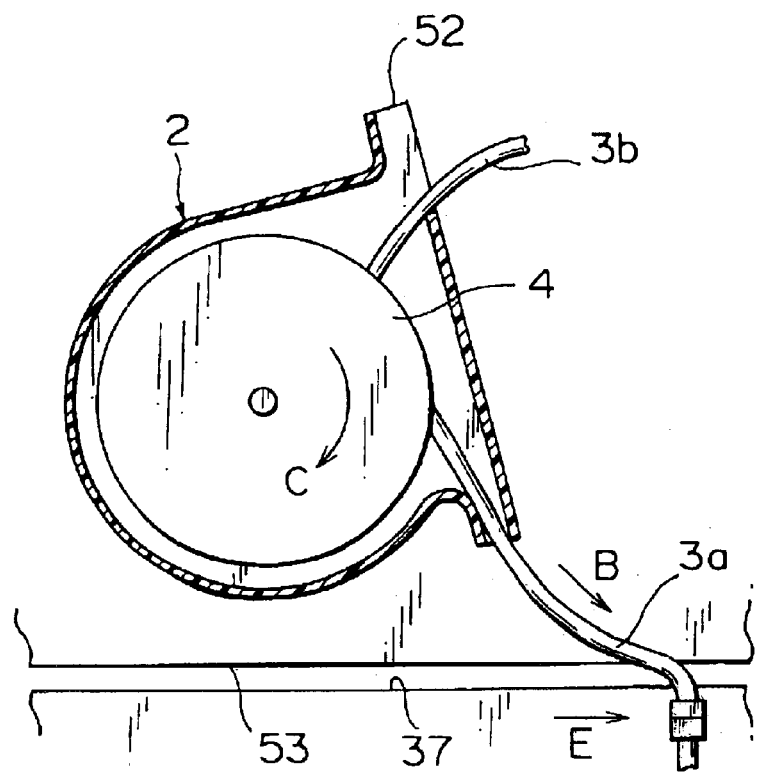
FIG. 13 is an explanatory illustration showing an action (also drawing of an electric wire) of the electric wire excess length absorbing device of FIG. 10.

When the mating connecting portion side 37 further proceed in the arrow E direction, the casing 2 further turns in the arrow G (FIG. 12) direction as shown in FIG. 13, the wiring harness 3a is drawn out of the opening portion 51 as shown by the arrow B. The reel 4 turns in the C direction against the energization of the spiral spring 5 (FIG. 2). The fixed-side wiring harness 3b is led out of the opening portion 52 toward a fixing portion (not shown) provided on the wall portion 53.

Figure 14:
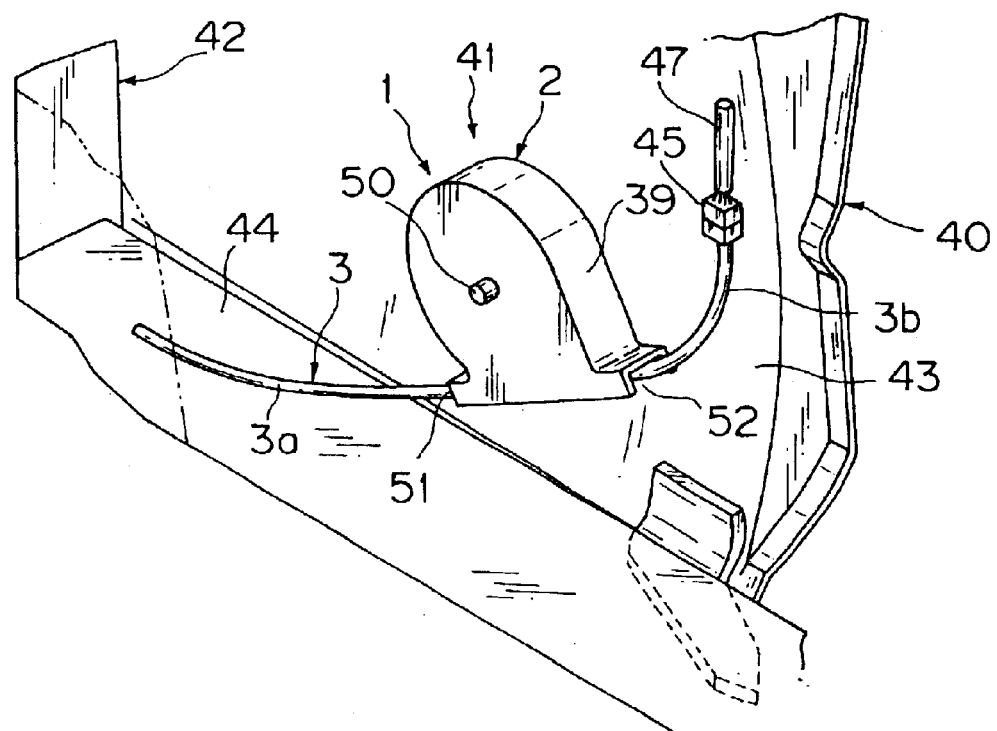
FIG. 14 is a perspective view showing the first embodiment of the inventive sliding door-use power feeding apparatus using the electric wire excess length absorbing device.
Figure 15:
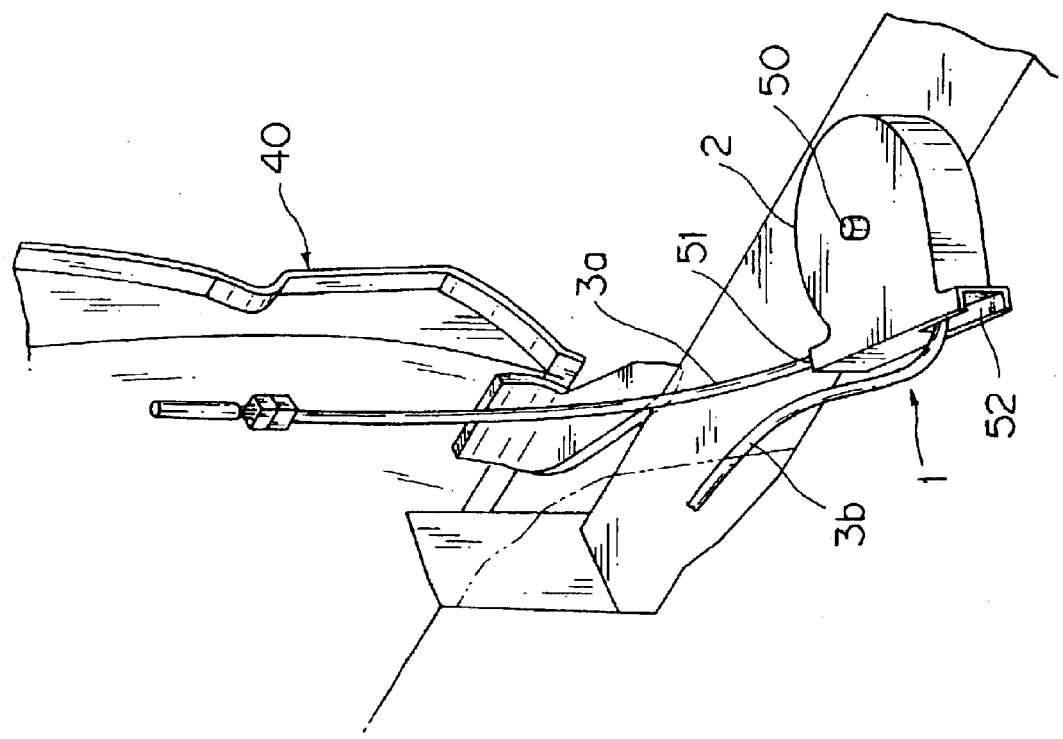
FIG. 15 is a perspective view showing the sliding door-use power feeding apparatus, of FIG. 14, in an opened state of the sliding door.

FIG. 14–FIG. 15 show the first embodiment of the inventive sliding door-use power feeding apparatus, wherein the electric wire excess length absorbing device 1 of FIG. 10 is applied to the sliding door 40 of a motor vehicle such as a one-box car.

This sliding door-use power feeding apparatus 41 has the electric wire excess length absorbing device 1 which is pivotably arranged on the sliding door 40 vertically, the moving-side wiring harness 3a led out of the opening portion 51 of the electric wire excess length absorbing device 1 toward a vehicle body 42, and the fixed-side wiring harness 3b led out of the opening portion 52 toward the sliding door 40. Here, the structure of the electric wire excess length absorbing device 1 is of the embodiment of FIG. 1–FIG. 5 or of FIG. 6–FIG. 9. This can be said to the second embodiment of the inventive sliding door-use power feeding apparatus described later.

The electric wire excess length absorbing device 1 is pivotably supported at one rotary shaft 50 of the casing 2 by the door panel 43 made of metal. The other rotary shaft 50 is pivotably supported by a door trim (not shown) by attaching the door trim to the door panel 43. The door panel 43 corresponds to the wall portion 53 of FIG. 3, and the door trim corresponds to the wall portion 54 of FIG. 3. The electric wire excess length absorbing device 1 is hidden by the door trim and is pivotable between the door panel 43 and the door trim.

The moving-side wiring harness 3a led out of the opening portion 51 is preferably arranged under a step 44 of the vehicle body 42. If the moving-side wiring harness 3a led out of the opening portion 51 is arranged on the step 44 of the vehicle body 42, it is protected by a scuff-plate made of synthetic resin. The moving-side wiring harness 3a led out of the opening portion 51 is supported by a harness fixing member (not shown) on a body panel (44 is also applied) and connected to a wiring harness (not shown) on the vehicle body 42 by means of a connector.

The fixed-side wiring harness 3b is led out of the opening portion 52 of the casing 2 and connected to a wiring harness 47 on the sliding door 40 by means of the connector 45. The wiring harness 47 on the sliding door 40 is connected to the auxiliaries (not shown). The auxiliaries includes, for example, a powerwindow motor, a door lock unit, a speaker, an automatic door opening-and-closing unit, and a switch unit. The power feeding (including the power current and the signal current) can always be done by the electric wire excess length absorbing device 1 regardless of the opening-closing movement of the sliding door 40.

When the sliding door 40 has been closed as shown in FIG. 14, the moving-side wiring harness 3a is drawn out of the opening portion 51 of the casing 2 rearward (corresponding to FIG. 11).

As shown in FIG. 15, when the sliding door 40 is opened, the wiring harness 3a moves rearward, and the casing 2 turns around the rotary shaft 50 in the arrow G direction. When the opening portion 51 is directed downward, the wiring harness 3a is wound up on the reel 4 in the maximum state.

When the sliding door has been fully opened as shown in FIG. 15, the casing has turned by not less than 90 degrees, and the wiring harness has been drawn out a little again (corresponding to FIG. 13).

Here, the electric wire excess length absorbing device 1 is preferably positioned such that the drawn-out or pulled-out length of the wiring harness 3a is almost equal in both the fully opened state and the fully closed state of the sliding door 40. This is similar in the following embodiments.

Figure 18:
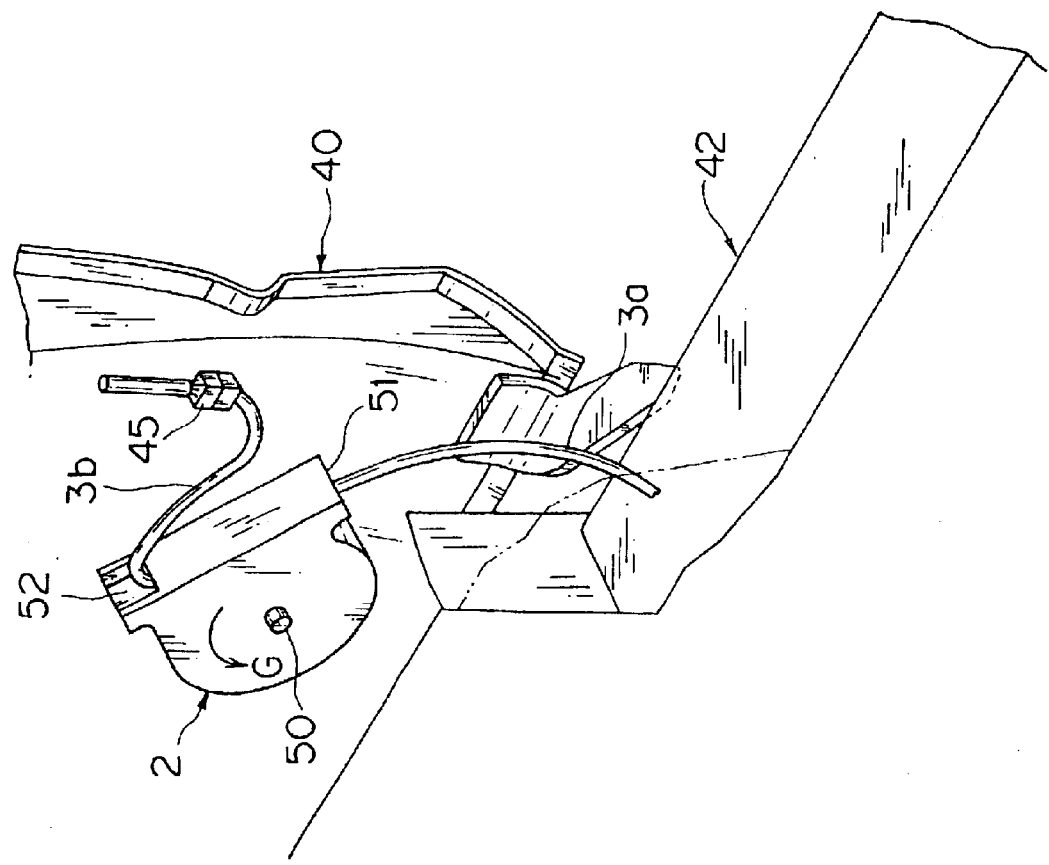
FIG. 18 is a perspective view showing the sliding door-use power feeding apparatus, of FIG. 16, in an opened state of the sliding door.
Figure 16:
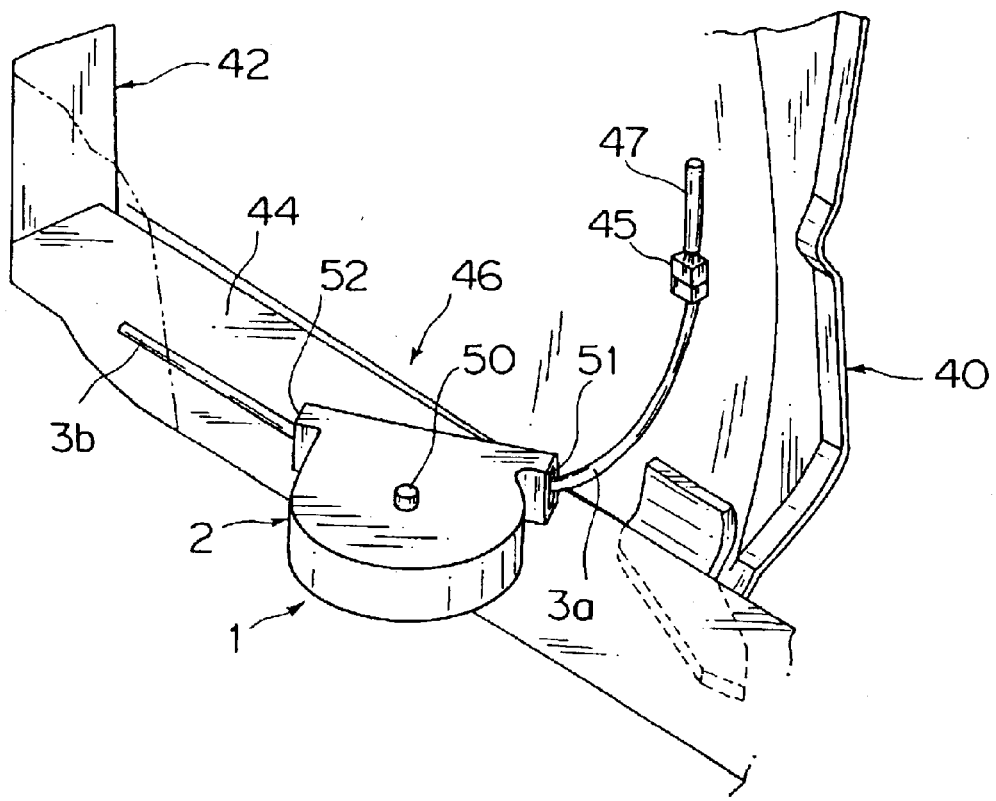
FIG. 16 is a perspective view showing the second embodiment of the inventive sliding door-use power feeding apparatus using the electric wire excess length absorbing device.

FIG. 16–FIG. 18 show the second embodiment of the sliding door-use power feeding apparatus. The inventive sliding door-use power feeding apparatus 46 has the electric wire excess length absorbing device 1 which is horizontally arranged in the vehicle body 42.

The electric wire excess length absorbing device 1 is pivotably arranged on or under the step 44, while being protected by a scuff-plate. As shown in FIG. 17, the casing 2 is pivotably supported between two horizontal wall portions 44,49 such as the step and the scuff-plate. The wall portions 44,49 correspond to the wall portion 53,54 of FIG. 3, and the shaft portions 50 are pivotably supported by the bearings 55.

The moving-side wiring harness 3a led out of the opening portion 51 of the casing 2 is arranged on the sliding door 40 and connected to a wiring harness 47 on the sliding door by the connector 45. The fixed-side wiring harness 3b led out of the opening portion 52 of the casing 2 is connected a power source through a connector.

Referring to FIG. 16, in a closed state of the sliding door 40, the moving-side wiring harness 3a is led out almost horizontally at the vicinity of the opening portion 51 toward the sliding door 40. The wiring harness 3a is fixed to the sliding door 40 with a band or another fixing member (not shown) near the connector 45.

Referring to FIG. 18, when the sliding door 40 is opened rearward from the closed state of FIG. 16, the wiring harness 3a moves or swings rearward. The casing 2 turns simultaneously with the wiring harness 3a around the rotary shaft 50 of the casing 2

When the opening portion 51 of the casing 2 comes to a position closest to the sliding door 40, the wiring harness 3a has been wound up on the reel 4 (FIG. 11) in the maximum state. Subsequently, the casing 2 further turns as shown in FIG. 18, and the wiring harness 3a is again drawn from the reel 4.

When the sliding door 40 is closed as shown in FIG. 16 from its opened state of FIG. 18, the wiring harness 3a is once wound on the reel 4 and drawn out of the reel 4 as shown in FIG. 16.

Here, the electric wire excess length absorbing device 1 may be horizontally (or laterally) installed inside the sliding door 40 if the space inside the sliding door 40 permits it.

Though the rotary shafts 50 are provided on the casing 2 in the above embodiments, the wall portions 53,54 may be provided with the rotary shafts 50.

FIG. 19–FIG. 22 show the third embodiment of the inventive electric wire excess length absorbing device. In these figures, the same reference characters as those of the first embodiment of the electric wire excess length absorbing device (FIG. 1–FIG. 5) are assigned to the same elements.

The electric wire excess length absorbing device 1 has a generally cylindrical casing 2 made of synthetic resin, a generally disc-shaped reel 4 made of synthetic resin and pivotably provided in the casing 2 to wind a wiring harness (electric wires) 3, and a spiral spring 5 (FIG. 20, FIG. 21) made of metal to energize the reel 4 in one rotary direction. A long opening portion 6 for leading out the wiring harness is provided on the casing 2.

The casing 2 consists of a first casing body 7 and a second casing body 8 and has a reel accommodating portion 9 (FIG. 20) and a harness leading-out portion 10 in a tangential direction of the reel accommodating portion 9. The casing body 7 has a base plate portion 38 and a peripheral wall 39, and the casing body 8 has a base plate portion 21. Both the base plate portions 21,38 are in parallel with each other. The casing bodies 7,8 are fixed to each other with a non-shown male screw or an engaging means.

The harness leading-out portion 10 has the long opening portion 6 including front and rear openings 6a, 6b. The moving-side wiring harness 3a of the wiring harness 3 is led out of the opening portion 6 swingingly as shown in FIG. 1.

The fixed-side wiring harness 3b is led out of a small opening portion 11 of the casing 2 and fixed to the casing 2. The fixed-side wiring harness 3b is fixed with a bundling means such as a band (not shown) to a fixing wall 12 projectingly from an edge of the opening portion 11.

The wiring harness 3 is formed by covering a plurality of electric wires with a net-like tube, a corrugate tube made of synthetic resin, or vinyl tape. The wiring harness 3 can be formed with a single electric wire.

Referring to FIG. 20, the reel 4 has a small-diameter shank 13, a boss portion 14 continuing from the shank 13, a recess 15 positioned opposite to the shank 13, and a reel body 16. The reel body 16 has two disc portions 17 and an annular groove portion 18 formed between the disc portions 17. The reel 4 can be integrally molded of synthetic resin.

End portions of the respective shanks 13 pivotably engage the receiving portions 19 of the casing bodies 7,8. Each receiving portion 19 consists of an annular portion and a hole portion 22 inside the annular portion. The shank 13 enters the hole portion 22. A spiral spring 5 is arranged in the recess 15 of the reel 4, one end of the spiral spring 5 is fixed to the shank 13, and the other end of the spiral spring 5 is fixed to the casing body 7.

The wiring harness 3 is wound inside the groove portion 18 of the reel 4, and the moving-side wiring harness 3a of the wiring harness 3 is led out of the casing 2 from the opening portion 6. The reel 4 is energized by the spiral spring 5 in a winding direction of the wiring harness 3.

The wiring harness 3 goes through a small hole 23 (FIG. 21) of the disc portion 17, is loosely wound on the boss portion 14 along a side surface 4b of the reel 4, and is led out of the opening portion 11 (FIG. 19) of the casing 2. The winding direction of the fixed-side wiring harness 3b is opposite to that of the moving-side wiring harness 3a (3a', FIG. 20). A loosely wound portion 3b' (reel rotation absorbing portion) of the wiring harness 3b allows the turning or rotation of the reel 4 when the moving-side wiring harness 3a is pulled out.

Here, in place of the spiral spring 5, a coil spring (not shown) may be arranged in a radial direction of the reel 4 when the maximum turning angle of the reel 4 is small.

Figure 23:
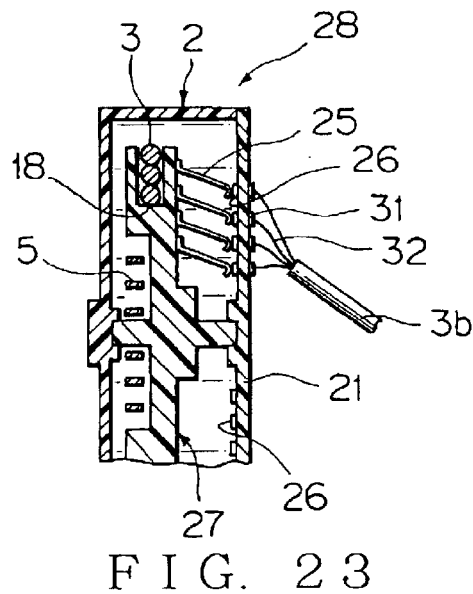
FIG. 23 is a longitudinal sectional view showing the fourth embodiment of the electric wire excess length absorbing device.
Figure 24:
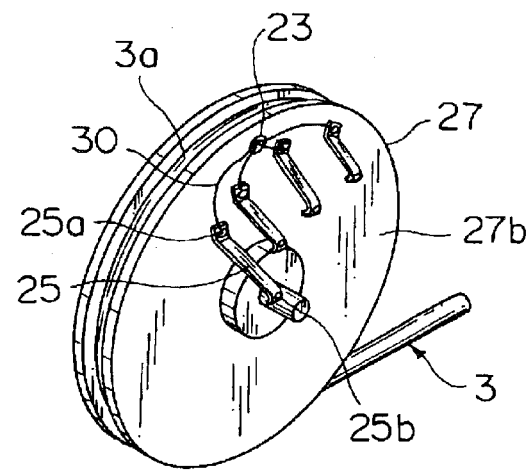
FIG. 24 is a perspective view showing a reel.
Figure 25:
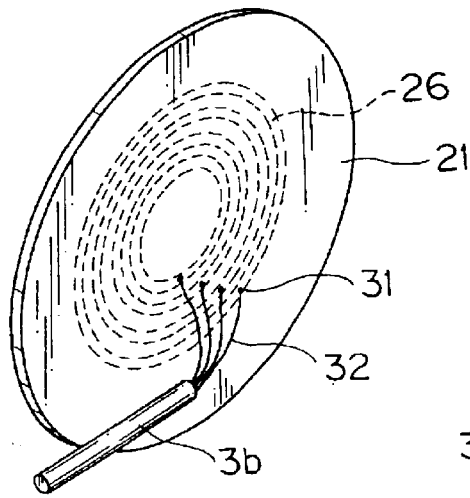
FIG. 25 is a perspective view showing an outside portion of a casing of the electric wire excess length absorbing device.

FIG. 23–FIG. 25 show the fourth embodiment of the inventive electric wire excess length absorbing device. In these figures, the same reference characters as those of the second embodiment of the electric wire excess length absorbing device (FIG. 6–FIG. 9) are assigned to the same elements. In this electric wire excess length absorbing device 28, the loosely wound portion 3b' (FIG. 22) is replaced with a contact terminal 25 and an annular circuit conductor 26 (reel rotation absorbing portion), which allow the rotation of a reel 27. The structure except the contact terminal 25 and the annular circuit conductor 26 is similar to the third embodiment.

A plurality of contact terminals 25 are provided on a side surface 27b of the reel 27 as shown in FIG. 24, one ends 25a of the contact terminals 25 are connected to the respective electric wires 30 of the moving-side wiring harness 3a. The boss portion 14 (FIG. 20) of the previous embodiment is not necessary on the reel 27. The wiring harness 3 consists of four electric wires 30 in the present embodiment. Each contact terminal 25 connected to the electric wire 30 by means of the soldering, the crimping or the like is fixed to the reel 27. Each contact terminal 25 has an elasticity and has a contact 25b for a circuit conductor 26.

Referring to FIG. 25, the circuit conductors 26 are concentrically annularly provided on an inner surface of the base plate portion 21 of the casing 2. Each circuit conductor 26 is connected to a fixed-side terminal portion 31 (FIG. 23) through the base plate portion 21 of the casing 2, and an electric wire 32 (FIG. 23, FIG. 25) of the fixed-side wiring harness 3b is connected to the terminal portion 31 by means of the soldering or the crimping.

A moving-side wiring harness 3a is wound inside a groove portion 18 (FIG. 23) of the reel 27, and one end side of the wiring harness 3a is led out of the opening portion 6 (FIG. 19) of the casing 2, and the other end side is put through a small hole 23 of the reel 27 and connected to the contact terminal 25.

Here, referring to FIG. 23, the contact terminals 25 may be provided on the base plate portion 21 of the casing 2, the annular circuit conductors 26 may be provided on the side surface 27b (FIG. 24) of the reel 27, the moving-side wiring harness 3a may be connected to the circuit conductors 26. In this case, the fixed-side wiring harness 3b is connected to the proximal end portions of the contact terminals 25 put through the base plate portion 21 of the casing 2.

The action of the electric wire excess length absorbing device 1 of the above third embodiment will be described below with reference to FIG. 26–FIG. 29. One side wall of the opening portion 6 of the casing 2 is outwardly curved, thereby forming a harness guide wall (electric wire guide wall) 34. The moving-side wiring harness 3a led out of the opening portion 6 is connected to a mating wiring harness 36 (FIG. 27) by means of the connector 35.

Figure 27:
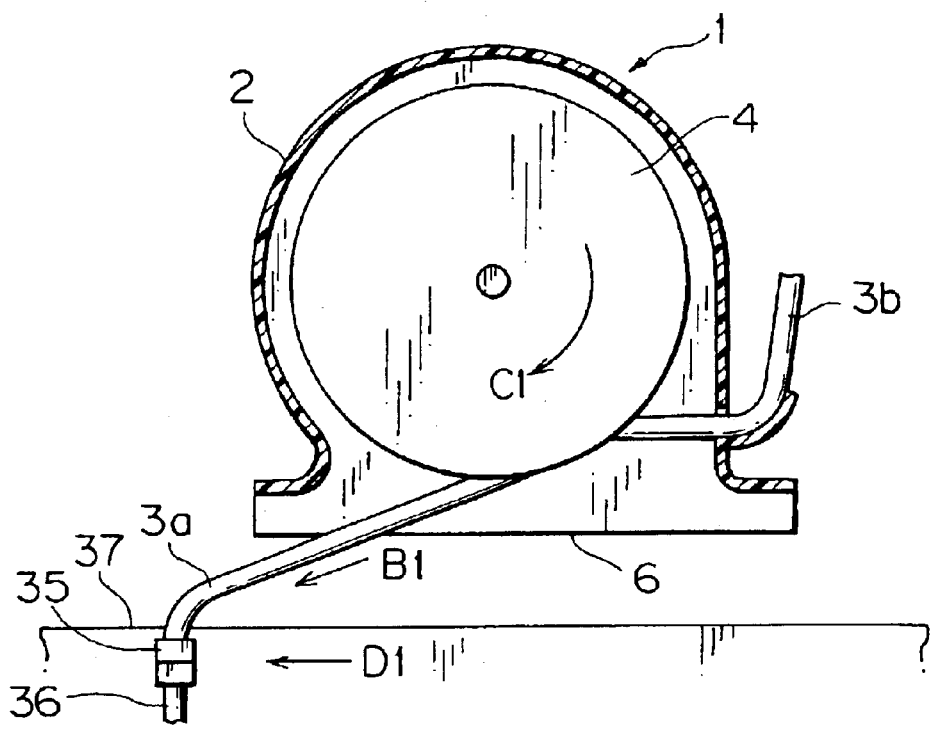
FIG. 27 is an explanatory illustration showing an action (drawing of an electric wire) of the electric wire excess length absorbing device of FIG. 26.

Referring to FIG. 27, when the mating connecting portion side 37 moves in the arrow D1 direction with respect to the electric wire excess length absorbing device 1, the wiring harness 3a is drawn out of the casing 2 as shown by the arrow B1 against the force of the spiral spring 5 (FIG. 20), and the reel 4 turns as shown by the arrow C1. When the reel 4 is turned, the winding diameter of the loosely wound portion 3b' (FIG. 20) reduces. (The contact terminals 25 of FIG. 23 move integrally with the reel 27 along the circuit conductors 26.) Here, FIG. 27 illustrates correspondingly to the embodiment of FIG. 20.

Figure 28:
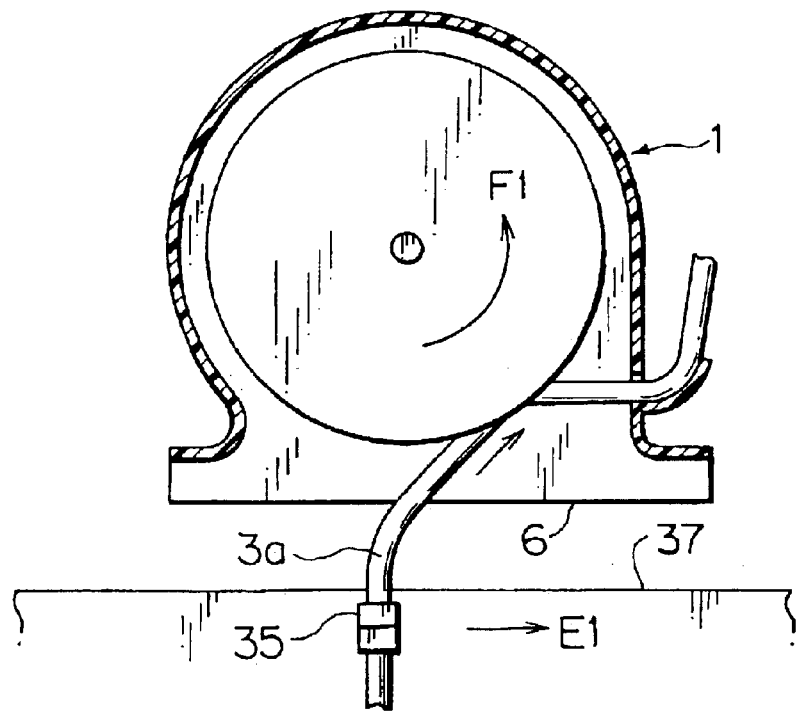
FIG. 28 is an explanatory illustration showing an action (winding the electric wire) of the electric wire excess length absorbing device of FIG. 26.

Referring to FIG. 28, when the mating connecting portion side 37 moves in the arrow E1 direction with respect to the electric wire excess length absorbing device 1, the wiring harness 3a is wound up by the reel 4. The reel 4 turns in the arrow F1 direction by virtue of the spiral spring 5 (FIG. 20) so as to wind up the wiring harness 3a. By this, the slack, i.e. the excess length, of the wiring harness 3a is absorbed.

Figure 29:
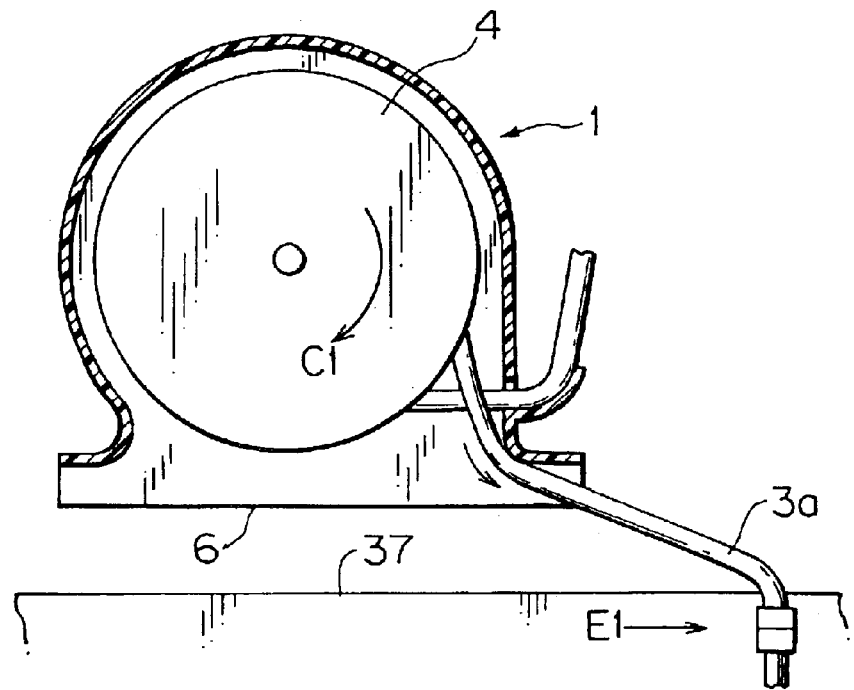
FIG. 29 is an explanatory illustration showing an action (also drawing of an electric wire) of the electric wire excess length absorbing device of FIG. 26.

When the mating connecting portion side 37 continues to relatively move in the E1 direction from a state of FIG. 28, the wiring harness 3a is drawn out of the opening portion 6 as shown in FIG. 29, while the reel 4 turns in the C1 direction against the energization of the spiral spring 5.

Figure 26:
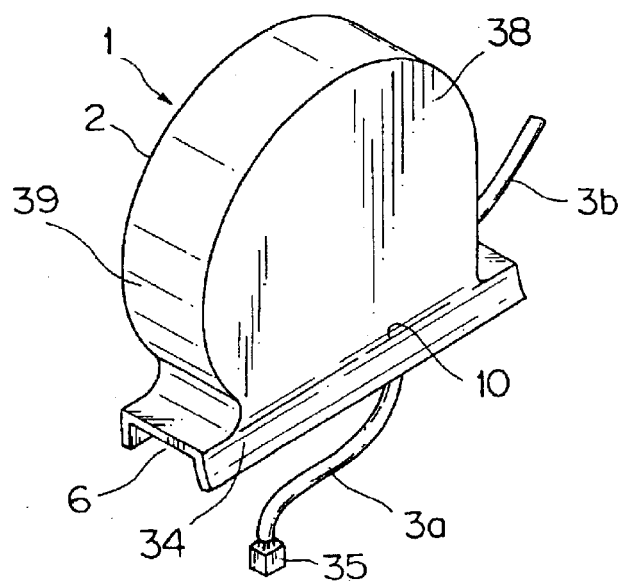
FIG. 26 is a perspective view showing the third embodiment of the electric wire excess length absorbing device for explaining an action thereof hereinafter.
Figure 30:
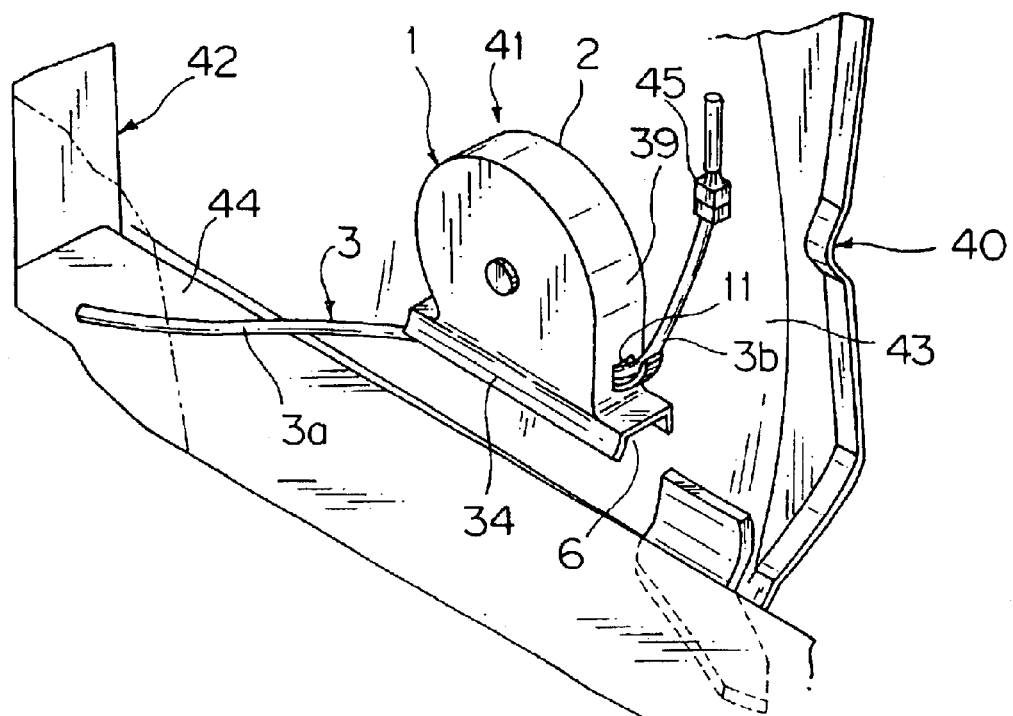
FIG. 30 is a perspective view showing the third embodiment of the inventive sliding door-use power feeding apparatus using the electric wire excess length absorbing device.
Figure 31:
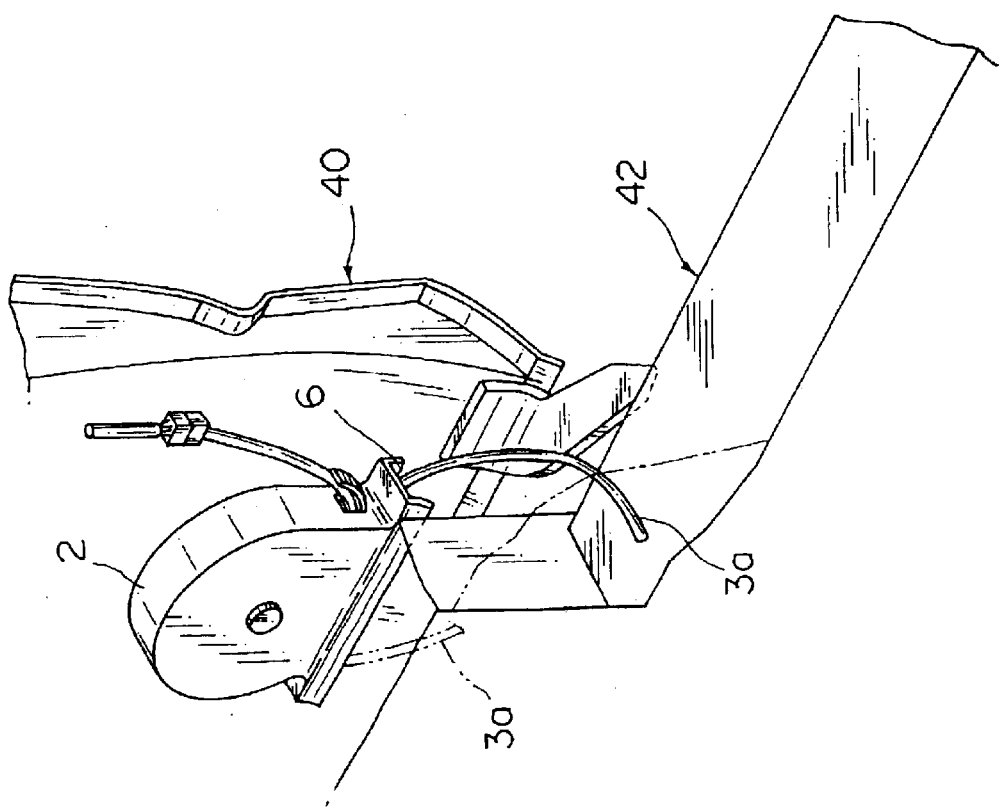
FIG. 31 is a perspective view showing the sliding door-use power feeding apparatus, of FIG. 30, in an opened state of the sliding door.

FIG. 30–FIG. 31 show the third embodiment of the inventive sliding door-use power feeding apparatus, wherein the electric wire excess length absorbing device 1 of FIG. 26 is applied to the sliding door 40 of a motor vehicle such as a one-box car.

This sliding door-use power feeding apparatus 41 has the electric wire excess length absorbing device 1, which is arranged on the sliding door 40 vertically, and the wiring harness 3 led out of the opening portion 6 of the electric wire excess length absorbing device 1 toward a vehicle body 42. Here, the structure of the electric wire excess length absorbing device 1 is of the embodiment of FIG. 19–FIG. 22 or of FIG. 23–FIG. 25. This can be said to the fourth and fifth embodiments of the sliding door-use power feeding apparatus described later.

The electric wire excess length absorbing device 1 is fixed to the door panel 43 made of metal and hidden by attaching a door trim (not shown) onto the door panel 43. The electric wire excess length absorbing device 1 is vertically arranged between the door panel 43 and the door trim. The wiring harness 3 led out of the opening portion 6 is preferably arranged under a step 44 of the vehicle body 42. If the wiring harness 3 led out of the opening portion 6 is arranged on the step 44 of the vehicle body 42, it is protected by a scuff-plate made of synthetic resin. The wiring harness 3 led out of the opening portion 6 is supported by a harness fixing member (not shown) on a body panel (44 is also applied) and connected to a wiring harness (not shown) on the vehicle body 42 by means of a connector.

The fixed-side wiring harness 3b is led out of the opening portion 11 of the peripheral wall 39 of the casing 2 and connected to the auxiliaries (not shown) on the sliding door 40 by means of the connector 45. The auxiliaries include, for example, a powerwindow motor, a door lock unit, a speaker, an automatic door opening-and-closing unit, and a switch unit. The power feeding (including the power current and the signal current) can always be done by the electric wire excess length absorbing device 1 regardless of the opening-closing movement of the sliding door 40.

When the sliding door 40 has been closed as shown in FIG. 30, the moving-side wiring harness 3a is drawn out of the opening portion 6 of the casing 2 rearward (corresponding to FIG. 27). When the sliding door 40 slides rearward as shown in FIG. 31, the wiring harness 3a is wound up on the reel 4, while forwardly moving along the opening portion 6 of the casing 2 (corresponding to FIG. 28). Finally, as shown in FIG. 31, the wiring harness 3a reaches the front end of the opening portion 6 (corresponding to FIG. 29). At this time, the wiring harness 3a slides along the curved harness guide wall 34 smoothly.

When the sliding door 40 is closed from the opened state of FIG. 31, the moving-side wiring harness 3a of FIG. 31 rearwardly moves. When the casing 2 comes to a position closest to the harness fixing portion provided on the vehicle body side, the wiring harness 3a is wound up on the reel 4 in the maximum state (corresponding to FIG. 28). Subsequently, the wiring harness 3a is drawn out rearward as shown in FIG. 30 (corresponding to FIG. 27).

Here, the electric wire excess length absorbing device 1 is preferably positioned such that the drawn-out or pulled-out length of the wiring harness 3a is almost equal in both the fully opened state and the fully closed state of the sliding door 40. This is similar in the following embodiments.

Figure 33:
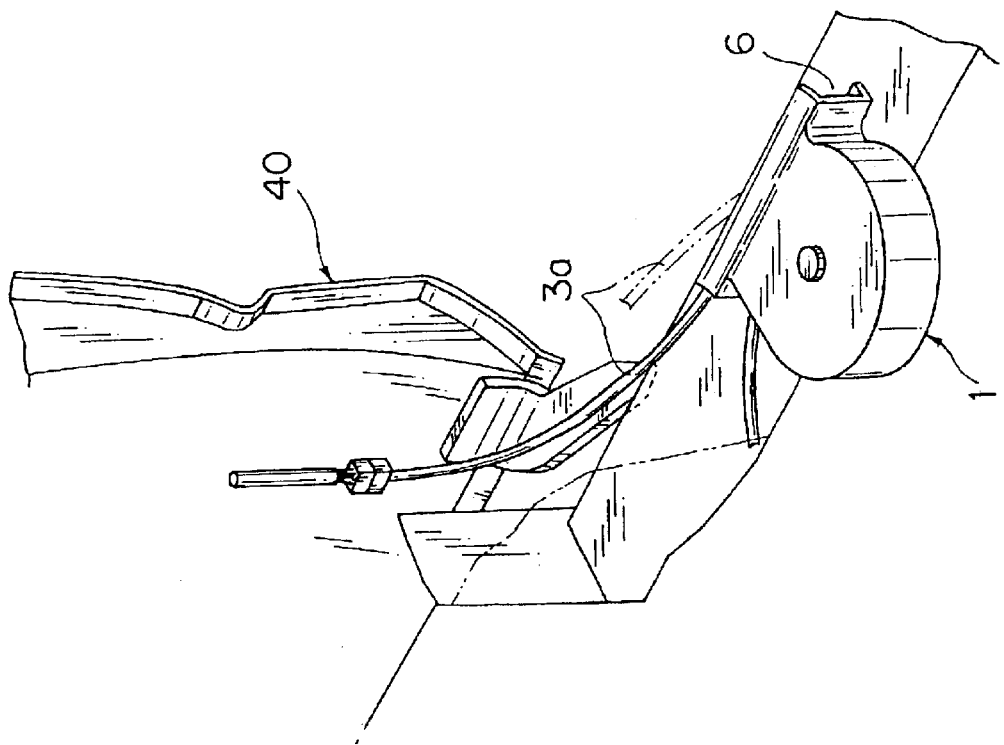
FIG. 33 is a perspective view showing the sliding door-use power feeding apparatus, of FIG. 32, in an opened state of the sliding door.
Figure 32:
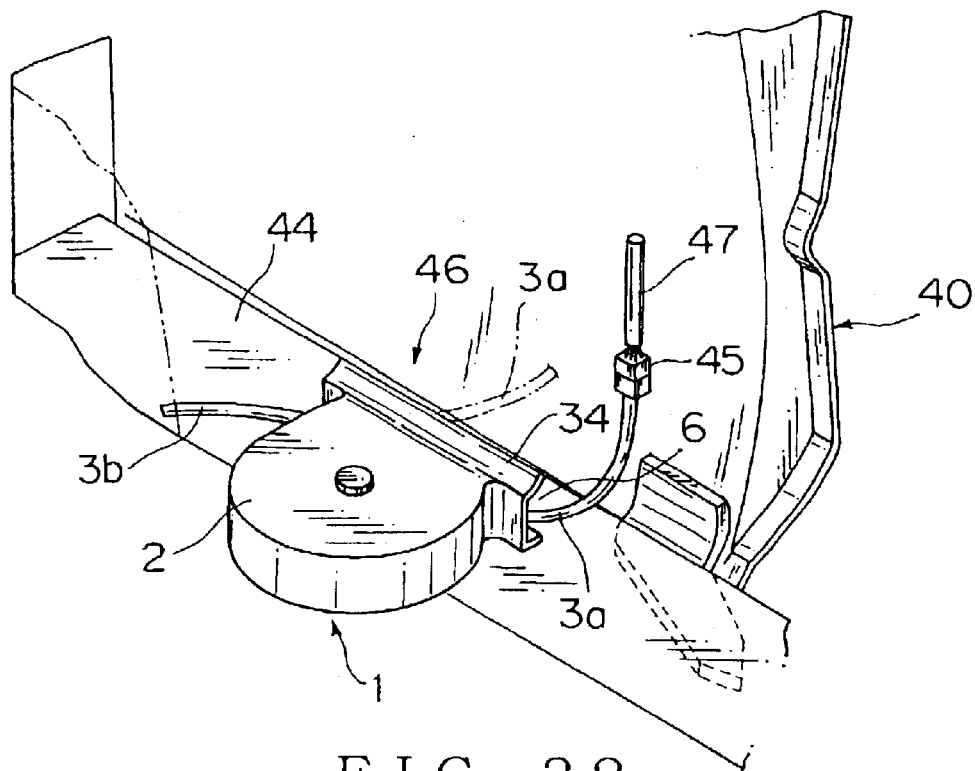
FIG. 32 is a perspective view showing the fourth embodiment of the inventive sliding door-use power feeding apparatus using the electric wire excess length absorbing device.

FIG. 32–FIG. 33 show the fourth embodiment of the sliding door-use power feeding apparatus. The inventive sliding door-use power feeding apparatus 46 has the electric wire excess length absorbing device 1 which is horizontally arranged in the vehicle body 42.

The electric wire excess length absorbing device 1 is arranged on, or preferably under, the step 44 and protected with the scuff-plate or the like. The long opening portion 6 of the casing 2 horizontally faces the sliding door 40. The upper wall of the opening portion 6 is the upwardly curved harness guide wall 34.

The moving-side wiring harness 3a led out of the casing 2 is arranged on the sliding door 40 and connected to a wiring harness 47 on the sliding door by the connector 45. The fixed-side wiring harness 3b led out of the casing 2 is connected a power source through a connector.

Referring to FIG. 32, in a closed state of the sliding door 40, the moving-side wiring harness 3a is led out almost horizontally from the front end of the opening portion 6 toward the sliding door 40. The wiring harness 3a is fixed to the sliding door 40 with a band or another fixing member (not shown) near the connector 45.

When the sliding door 40 is opened from the closed state of FIG. 32 (corresponding to FIG. 27), the wiring harness 3a moves rearward along with the sliding door 40 along the opening portion 6, while being wound up by the reel 4 (FIG. 27) (corresponding to FIG. 28). Subsequently, the wiring harness 3a is drawn out of the reel 4 as shown in FIG. 33, while being positioned at the rear end of the opening portion 6 (corresponding to FIG. 29). When the sliding door 40 is closed as shown in FIG. 32 from its opened state shown in FIG. 33, the wiring harness 3a drawn rearward as shown in FIG. 33 moves forward along the opening portion 6, while being wound up on the reel 4. Subsequently, the wiring harness 3a is again drawn, while moving toward the front end side of the opening portion 6 as shown in FIG. 32.

Here, the electric wire excess length absorbing device 1 may be horizontally (or laterally) installed inside the sliding door 40 if the space inside the sliding door 40 permits it.

Figure 34:
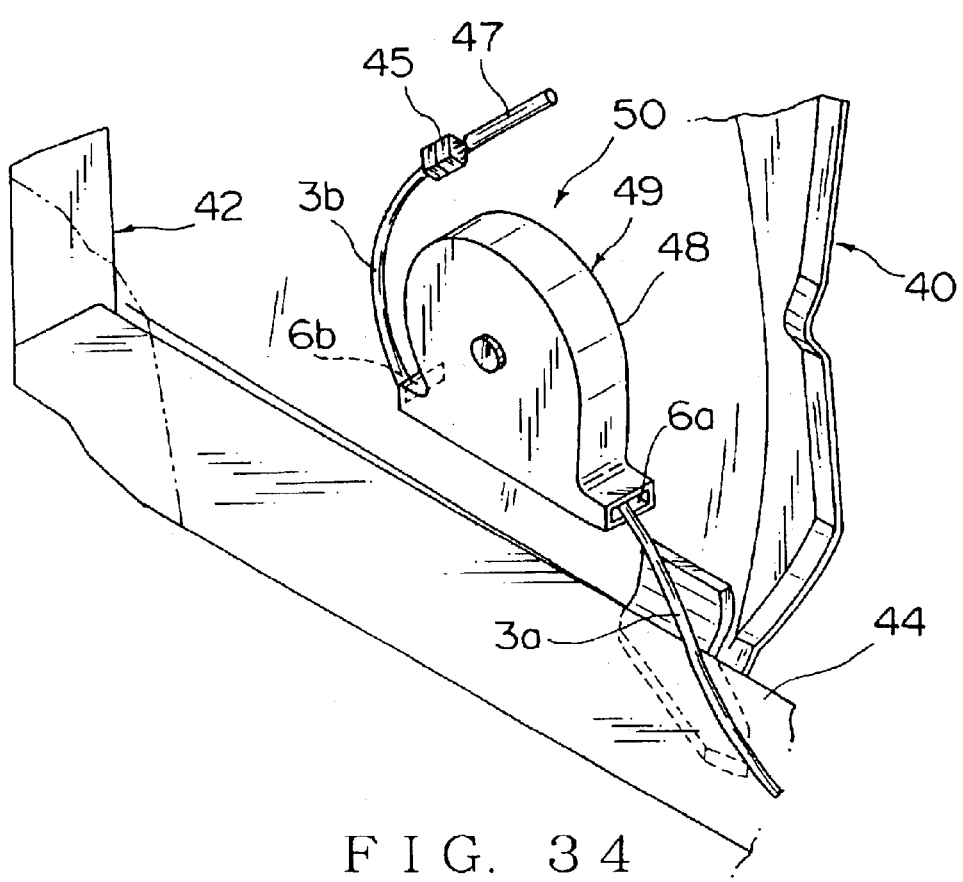
FIG. 34 is a perspective view showing the fifth embodiment of the inventive sliding door-use power feeding apparatus using the electric wire excess length absorbing device.
Figure 35:
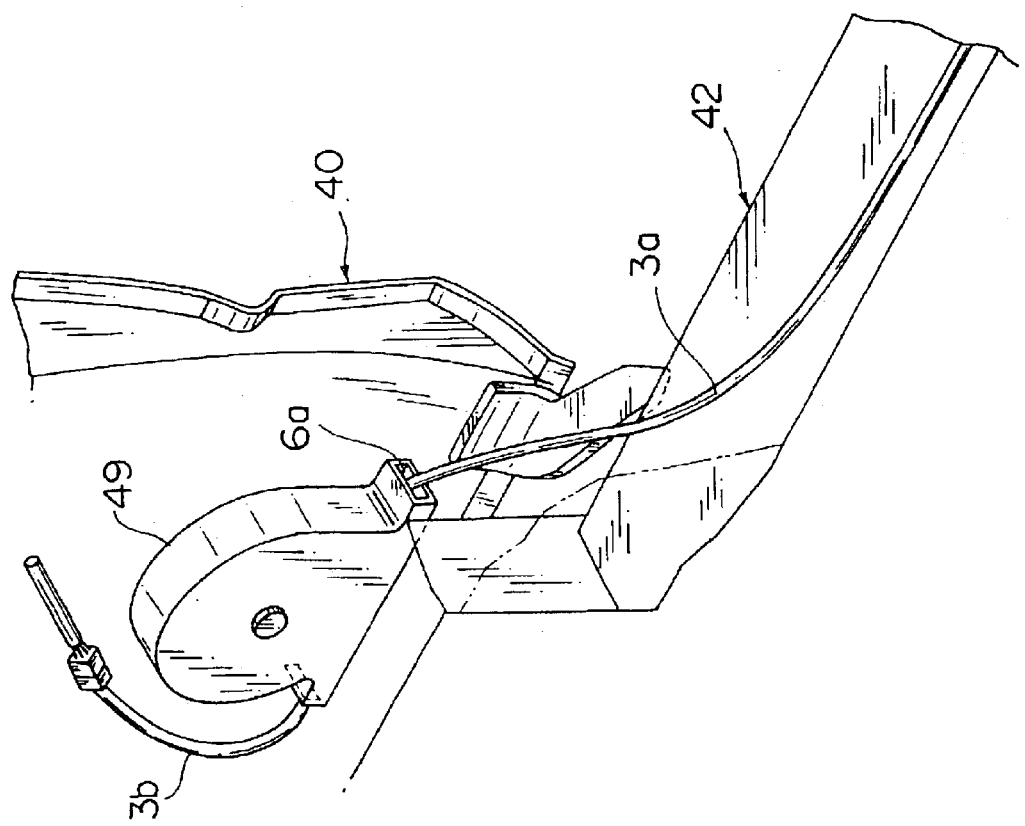
FIG. 35 is a perspective view showing the sliding door-use power feeding apparatus, of FIG. 34, in an opened state of the sliding door.

FIG. 34–FIG. 35 show the fifth embodiment of the sliding door-use power feeding apparatus. The sliding door-use power feeding apparatus 50 has an electric wire excess length absorbing device 49 wherein the casing 48 has narrow opening portions 6a, 6b instead of the long opening portion 6. This electric wire excess length absorbing device 49 is similar to the embodiment of FIG. 19–FIG. 22 except for the casing 48.

The wire excess length absorbing device 49 is vertically installed in the sliding door 40. The moving-side wiring harness 3a is fixed to a harness fixing portion (not shown) provided on a front portion of the door opening of the vehicle body 42. The fixed-side wiring harness 3b is connected to the wiring harness 47 of the sliding door side by mean of the connector 45. The moving-side wiring harness 3a is arranged on, or preferably under, the step 44 and protected with the scuff-plate or the like.

In the closed state of the sliding door 40 shown in FIG. 34, the moving-side wiring harness 3a has been wound up on the reel 4 (FIG. 20) in the casing 48, while being shortly drawn out of the opening portion 6a of the casing 48 toward the vehicle body 42. When the sliding door 40 is rearwardly opened as shown in FIG. 35 from the closed state of FIG. 34, the moving-side wiring harness 3a is drawn out of the opening portion 6a long, while the reel 4 rotates against the spring energization.

When the sliding door 40 is closed from the opened state shown in FIG. 35, the moving-side wiring harness 3a is wound up on the reel 4 which rotates against the energization of the spiral spring 5 (FIG. 20). The fixed-side wiring harness 3b does not move.

Here, the electric wire excess length absorbing device 49 of FIG. 34–FIG. 35 can be arranged vertically or laterally on the vehicle body 42. In this case, the moving-side wiring harness 3a is fixed to the front end of the sliding door 40, drawn long from the reel 4 in the closed state of the sliding door 40, and wound up on the reel 4 in the opened state of the sliding door 40.

FIG. 36–FIG. 39 shows the fifth embodiment of the inventive electric wire excess length absorbing device. In an electric wire excess length absorbing device 551, a curved harness guide wall (electric wire guide wall) 556 is formed at an opening portion 555 of a casing 552.

Figure 19:
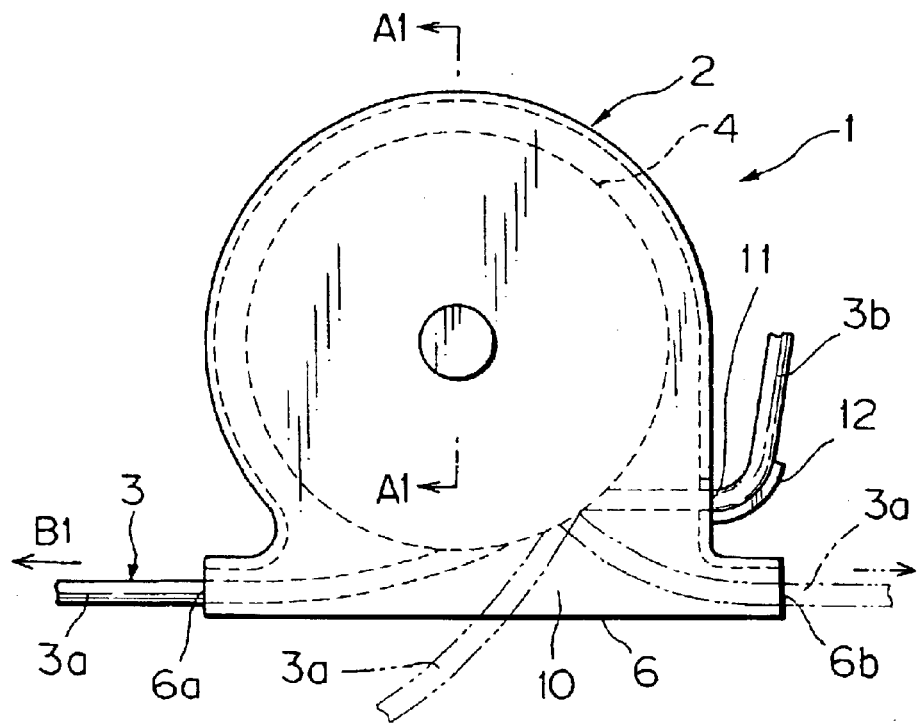
FIG. 19 is a front view showing the third embodiment of the inventive electric wire excess length absorbing device.

Though the harness guide wall 34 is formed only at one side edge of the opening portion 6 in the embodiment of FIG. 19, the harness guide wall 556 of this embodiment has three portions, i.e. a front portion 556b and side portions 556a.

The harness guide wall 556 smoothly continues from the front portion 556b to the right and left portions 556a. A moving-side wiring harness 557 is led out from the left in FIG. 36.

Figure 38:
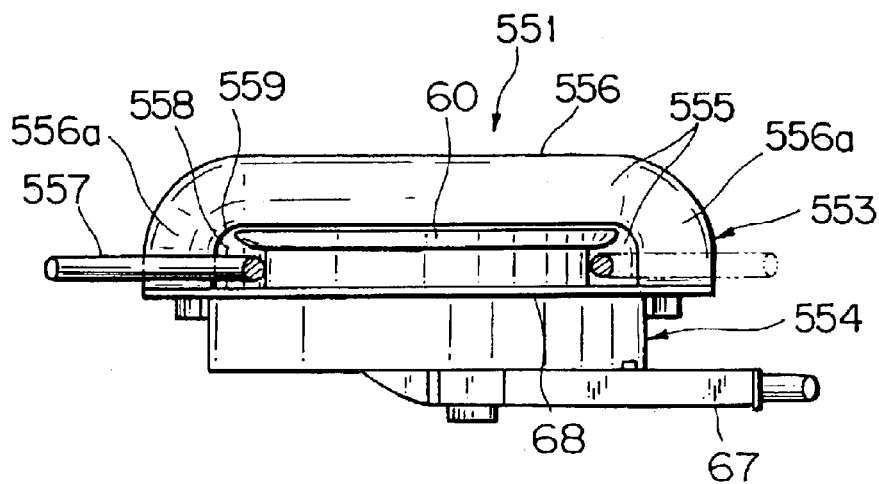
FIG. 38 is a bottom view showing the electric wire excess length absorbing device of FIG. 36.

The opening portion 555 and the harness guide wall 556 are formed on a first casing body (a cover) 553 of the casing 552. As shown in FIG. 38 (bottom view), the curved harness guide wall 556 is positioned outside the opening portion 555. The first casing body 553 has a space 558 continuing to the opening portion 555. The first casing body 553 has two smooth corner portions 559.

Figure 39:
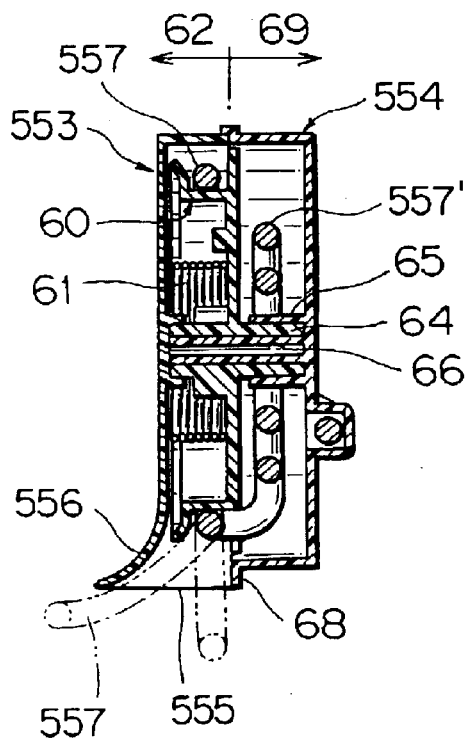
FIG. 39 is an H1—H1 sectional view of FIG. 37.

As shown in FIG. 39, a reel 60 and a coil spring (an energizing member) 61 are accommodated in the first casing body 553. The wiring harness 557 is wound on the reel 60, and the reel 60 is energized in a direction for winding the spring 61. The portion of the first casing body including the reel 60 and the spring 61 constitutes a harness expansion-contraction portion 62.

The opening portion 555 is positioned under the reel 60. A bottom edge portion of the reel 60 is positioned near the proximal end of the harness guide wall 556. The wiring harness 557 smoothly curves along an inner surface of the harness guide wall 556.

Figure 36:
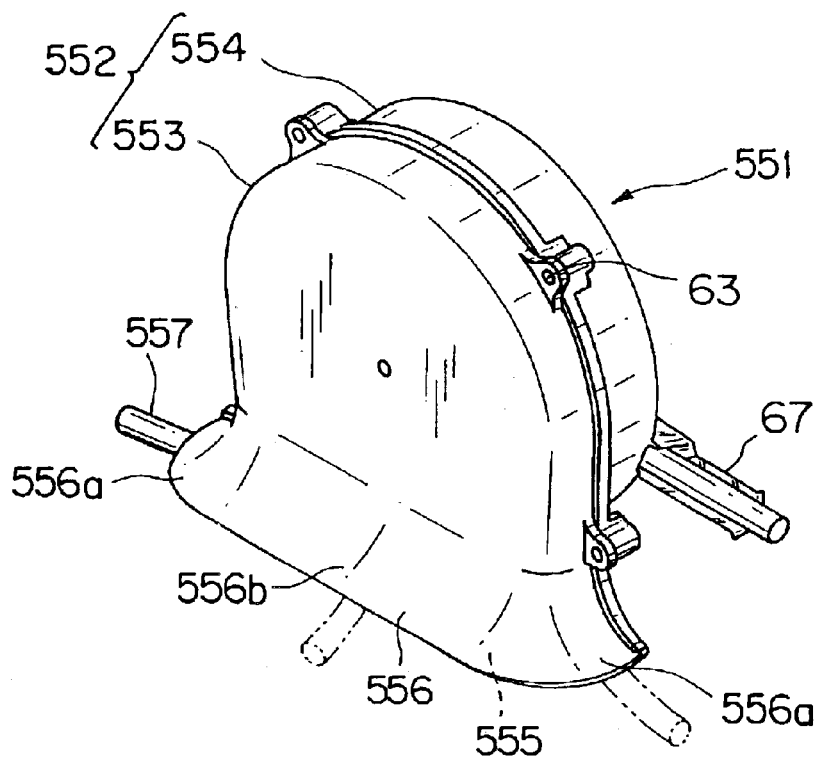
FIG. 36 is a perspective view showing the fifth embodiment of the inventive electric wire excess length absorbing device.
Figure 37:
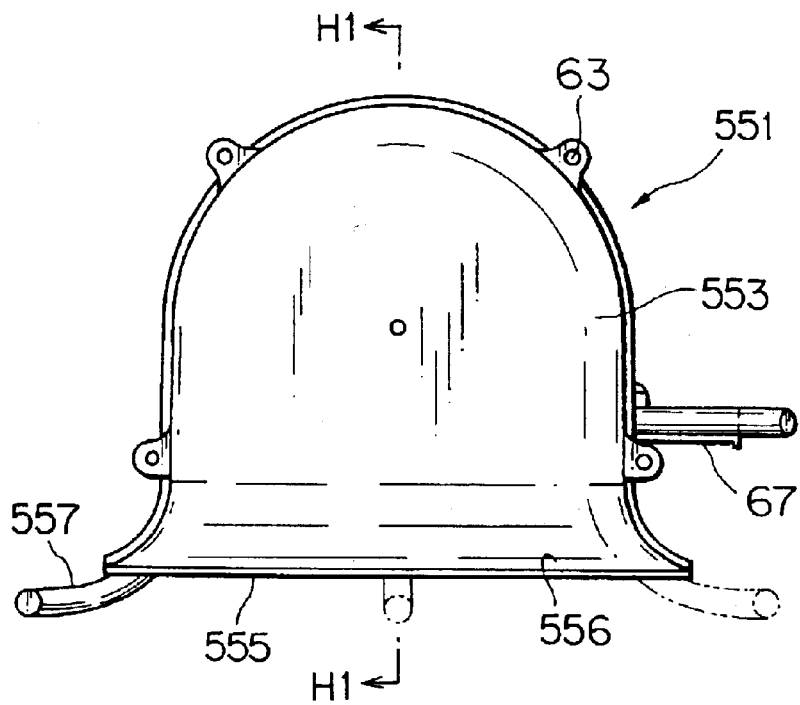
FIG. 37 is a front view showing the electric wire excess length absorbing device of FIG. 36.

As shown in FIG. 36, the first casing body 553 is fixed to a second casing body (a base) 554 with screws 63. The second casing body 554 is in a short-cylindrical shape. As shown in FIG. 39, a loosely wound wiring harness 557' is accommodated inside the second casing body 554. The loosely wound wiring harness 557' continues to the moving-side wiring harness 557 through an opening portion (not shown) of the reel 60. The reel 60 turns or rotates around a shank 64 which is pivotably supported by a receiving portion 65 on the casing bodies 553,554. A small-diameter supporting shaft 66 projecting from the second casing body 554 is inserted inside the shank 64. The loosely wound harness portion 557' is led out outwardly from the back side of the second casing body 554 and fixed to a fixing wall 67 (FIG. 38). The bottom of the second casing body 554 is formed as a back wall portion 68 of the opening portion 555. The portion of the second casing body including the loosely wound harness portion 557' acts as a reel rotation absorbing portion 69 (FIG. 39).

In a state of the above electric wire excess length absorbing device 551 being installed in the sliding door 40 as shown in FIG. 30, when the sliding door 40 is closed, the wiring harness 557 is rearwardly drawn out as shown with the solid line in FIG. 36. The wiring harness 557 is smoothly curved along the rear (i.e. left side) harness guide wall 556a. As the sliding door 40 is opened, the wiring harness 557 smoothly moves forward along the harness guide wall 556. When the sliding door 40 is closed from its opened state, the wiring harness 557 reversely moves along the harness guide wall 556.

Figure 40:
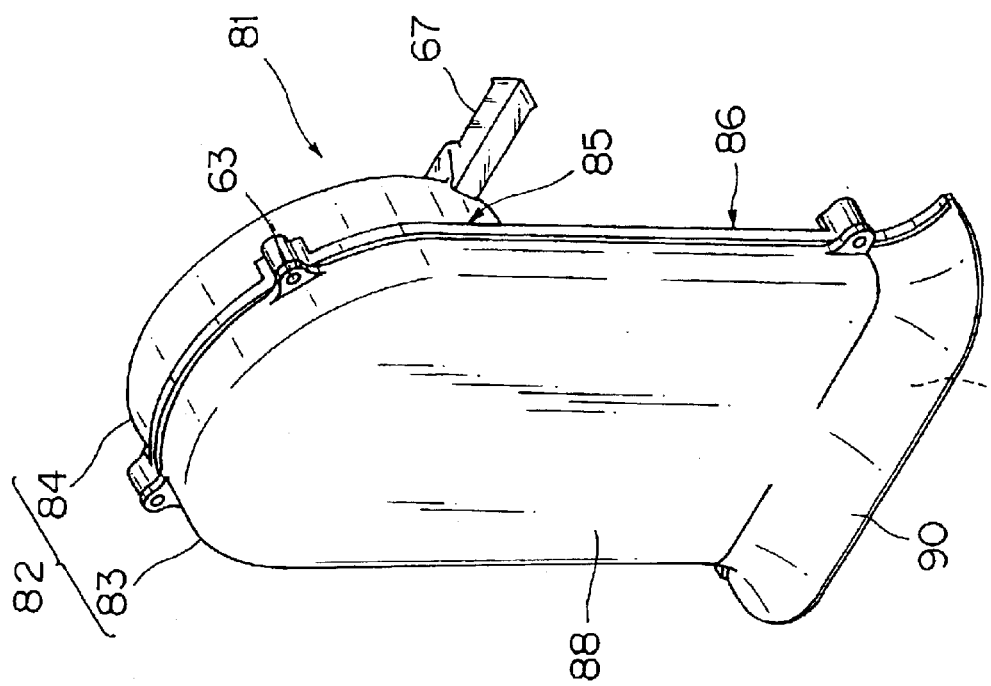
FIG. 40 is a perspective view showing the sixth embodiment of the inventive electric wire excess length absorbing device.
Figure 41:
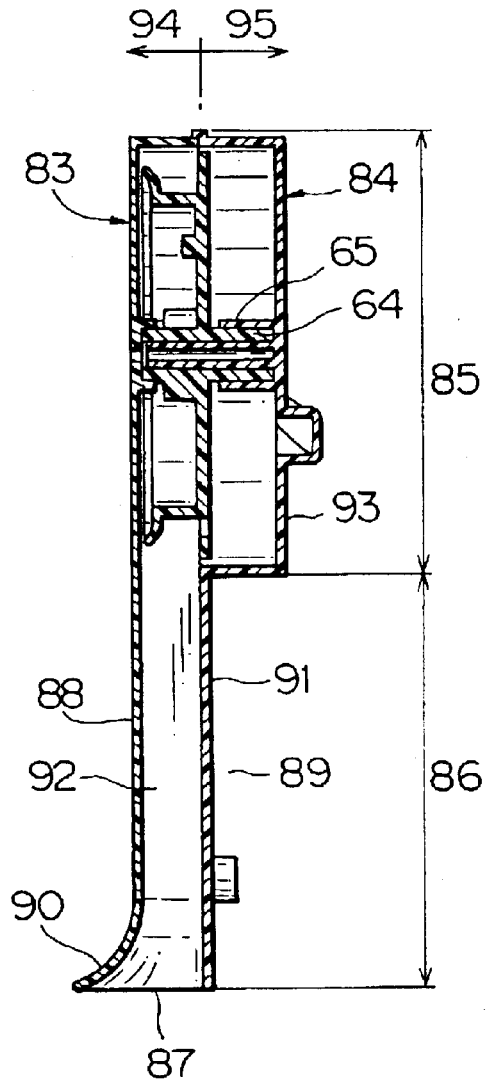
FIG. 41 is a longitudinal sectional view showing the electric wire excess length absorbing device of FIG. 40.
Figure 42:
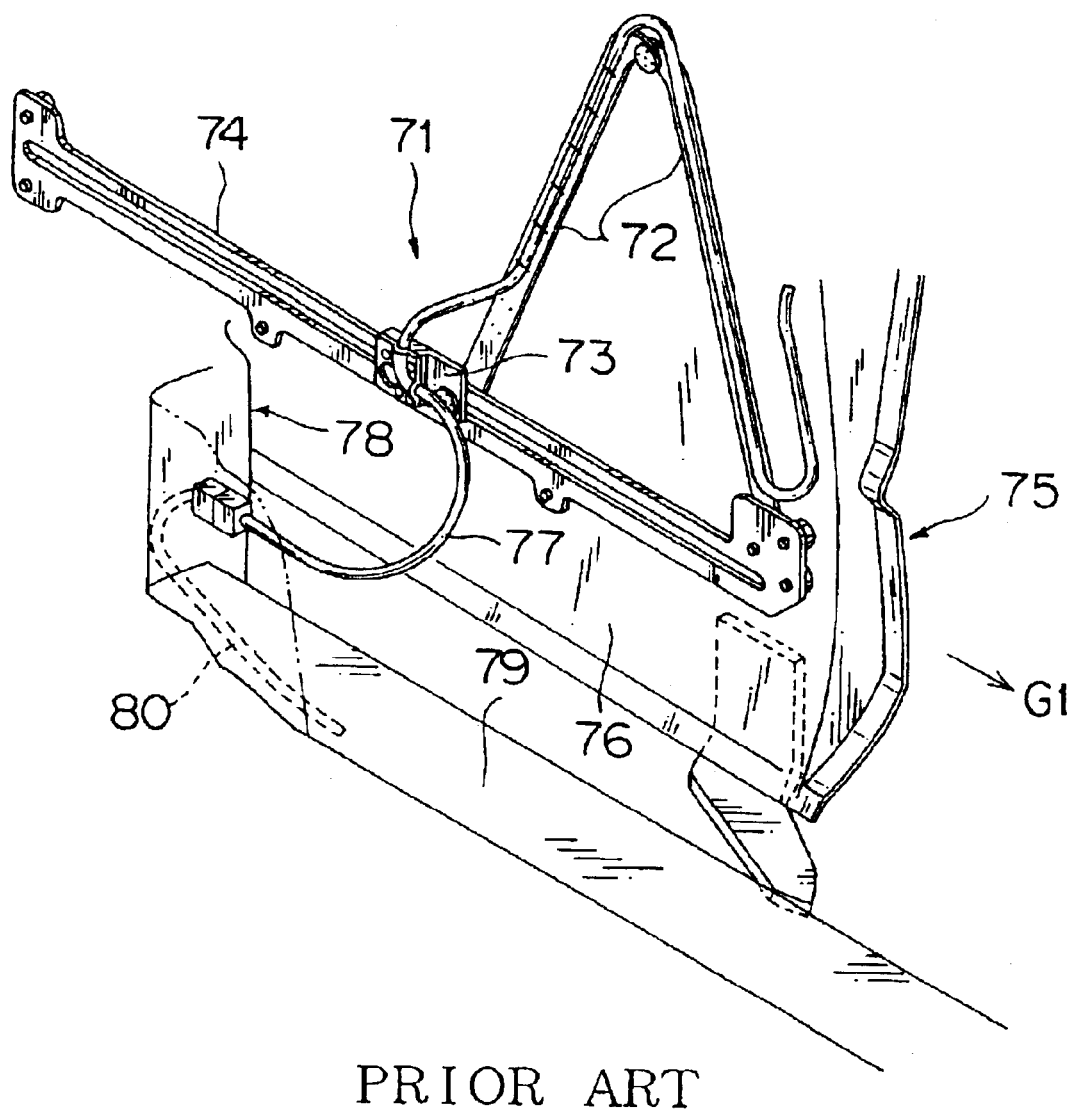
FIG. 42 is a perspective view showing a sliding door-use power feeding apparatus using a prior art electric wire excess length absorbing device.

FIG. 40–FIG. 41 show the sixth embodiment of the inventive electric wire excess length absorbing device. In these figures, the same reference characters as those of the fifth embodiment (FIG. 36–FIG. 39) of the electric wire excess length absorbing device are assigned to the same elements. FIG. 40–FIG. 41 show an electric wire excess length absorbing device 81 which has a harness winding portion 85 and a harness taking-out portion 86 having an extending portion 88 and an opening portion 87.

This structure enables the harness winding portion 85 to avoid an interference with another member such as a reinforcement bar (not shown) in the sliding door. That is, a space 89 is formed behind the extending portion 88 of the harness taking-out portion 86 of a casing 82, and the reinforcement bar can be arranged through the space 89. The electric wire excess length absorbing device 81 is vertically arranged in the sliding door.

The position of the opening portion 87 is determined near the harness fixing portion on the vehicle body 42 shown in FIG. 30–FIG. 31. The position of the harness winding portion 85 can be shifted by providing the extending portion 88 of the casing 82 in order to avoid the above interference.

A first casing body (a cover) 83 and a second casing body (a base) 84 is fixed to each other by screws 63 as shown in FIG. 40. The wiring harness is omitted in FIG. 40 and FIG. 41. At the bottom of the harness taking-out portion 86 of the casing 82, a curved harness guide wall 90 similar to that of FIG. 36 is formed.

The wiring harness drawn out of the reel 60 goes through a space 92 in the harness taking-out portion 86 and is smoothly curved along the harness guide wall 90.

The wiring harness swings back and forth in the harness taking-out portion 86 according to the opening-and-closing of the sliding door as shown in FIG. 27–FIG. 29.

The second casing body 84 has a wall portion 91 forming the harness taking-out portion 86. The second casing body 84 has a reel rotation absorbing portion 95 with a wall portion 93. The structure of the reel rotation absorbing portion 95 is similar to that of the fifth embodiment (FIG. 39). The harness winding portion 85 consists of the reel rotation absorbing portion 95 and the harness expansion-contraction portion 94.

The length of the harness taking-out portion 86 (i.e. the length of the extending portion 88) can be suitably determined according to the structure of the sliding door. The harness guide wall 90, the reel 60, the shank 64, the receiving portion 65 and the harness fixing wall 67 are the same as those of the previous embodiment shown in FIG. 39.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An electric wire excess length absorbing device, comprising:
    a casing having an electric wire leading-out portion;
    a reel pivotably provided in the casing for winding an electric wire; and
    an energizing member to energize the reel in a direction of winding the electric wire,
    wherein the casing is pivotably supported by an installing portion.

2. The electric wire excess length absorbing device as set forth in claim 1, wherein
    a rotary shaft is provided on the casing, and a receiving portion for the rotary shaft is provided on the installing portion.

3. The electric wire excess length absorbing device as set forth in claim 1, wherein
    a rotation center of the reel and a rotation center of the casing are aligned.

4. The electric wire excess length absorbing device as set forth in claim 1, wherein
    a loosely winding portion to loosely wind a fixed-side electric wire of the electric wire is provided on the reel.

5. The electric wire excess length absorbing device as set forth in claim 1, wherein
    a contact terminal is provided on one of the reel and the casing,
    an annular circuit conductor for the contact terminal is provided the other of the reel and the casing,
    a moving-side electric wire is connected to one of the contact terminal and the circuit conductor, and
    a fixed-side electric wire is connected to the other of the contact terminal and the circuit conductor.

6. A sliding door-use power feeding apparatus, wherein
    the electric wire excess length absorbing device set forth in any one of claims 1–5 is pivotably arranged on one of the sliding door and a vehicle body,
    the electric wire or the moving-side electric wire is arranged on the other of the sliding door and the vehicle body, and
    the electric wire having a fixed-side is arranged on the one of the sliding door and the vehicle body.

7. The sliding door-use power feeding apparatus as set forth in claim 6, wherein
    the electric wire excess length absorbing device is laterally arranged, and
    the electric wire is led out of the electric wire leading-out portion substantially horizontally.

8. An electric wire excess length absorbing device, comprising:
    a casing having an electric wire leading-out portion;
    a reel pivotably provided in the casing for winding an electric wire; and
    an energizing member to energize the reel in a direction of winding the electric wire,
    wherein the casing is provided with an opening portion, being long, enabling the electric wire to be swingably led out thereof,
    wherein the casing is supported by an installing portion.

9. The electric wire excess length absorbing device as set forth in claim 8, wherein
    the opening portion is formed extending over a width of the casing.

10. The electric wire excess length absorbing device as set forth in claim 8, wherein
    an electric wire guide wall, being curved, is formed along an edge of the opening portion.

11. The electric wire excess length absorbing device as set forth in claim 8, wherein
    the casing extends between the reel and the opening portions.

12. The electric wire excess length absorbing device as set forth in claim 8, wherein
    the opening portion faces a radial direction of the reel, and
    a reel rotation absorbing portion is positioned adjoining to the reel in an axial direction of the reel.

13. The electric wire excess length absorbing device as set forth in claim 12, wherein
    a loosely winding portion, to loosely wind a fixed-side electric wire continuing from the electric wire, is provided as the reel rotation absorbing portion, and
    a portion to lead out the fixed-side electric wire is provided on the casing.

14. An electric wire excess length absorbing device, comprising:
    a casing;
    a reel pivotably provided in the casing for winding an electric wire; and
    an energizing member to energize the reel in a direction of winding the electric wire,
    wherein the casing is provided with an opening portion, being long, enabling the electric wire to be swingably led out thereof, wherein
    the opening portion faces a radial direction of the reel, and
    a reel rotation absorbing portion is positioned adjoining to the reel in an axial direction of the reel, wherein
    a contact terminal is provided on one of the reel and the casing,
    an annular circuit conductor for the contact terminal is provided the other of the reel and the casing,
    a moving-side electric wire is connected to one of the contact terminal and the circuit conductor, and
    a fixed-side electric wire is connected to the other of the contact terminal and the circuit conductor,
    whereby the reel rotation absorbing portion is constituted.

15. An electric wire excess length absorbing device, comprising:
    a casing;
    a reel pivotably provided in the casing for winding an electric wire; and
    an energizing member to energize the reel in a direction of winding the electric wire,
    wherein the casing is provided with an opening portion, being long, enabling the electric wire to be swingably led out thereof, wherein
    the electric wire excess length absorbing device is arranged on one of the sliding door and a vehicle body,
    the electric wire or the moving-side electric wire is arranged on the other of the sliding door and the vehicle body, and the flexed electric wire having a fixed-side is arranged on the one of the sliding door and the vehicle body.

16. The sliding door-use power feeding apparatus as set forth in claim 15, wherein the electric wire excess length absorbing device is laterally arranged such that the opening portion of the casing faces one of the vehicle body and the sliding door.

17. A sliding door-use power feeding apparatus, comprising:

an electric wire excess length absorbing device, comprising:

a casing having an opening portion for leading out an electric wire;

a reel pivotably provided in the casing for winding the electric wire; and an energizing member to energize the reel in a direction of winding the electric wire, wherein the electric wire excess length absorbing device is arranged on one of a sliding door and a vehicle body, a moving-side electric wire is arranged on the other of the sliding door and the vehicle body, and a fixed-side electric wire is arranged on the one of the sliding door and the vehicle body.

18. An electric wire excess length absorbing device, comprising:

a casing having an electric wire leading-out portion;

a reel pivotably provided in the casing for winding an electric wire; an an energizing member to energize the reel in a direction of winding the electric wire, wherein the casing is provided with an opening portion, being long, enabling the electric wire to be swingably led out thereof.

19. The electric wire excess length absorbing device as set forth in claim 18, wherein the opening is formed extending over a width of the casing.

20. The electric wire excess length absorbing device as set forth in claim 18, wherein an electric wire guide wall, being curved, is formed along an edge of the opening portion.

21. The electric wire excess length absorbing device as set forth in claim 18, wherein the casing extends between the reel and the opening portions.

22. The electric wire excess length absorbing device as set forth in claim 18, wherein the opening portion faces a radial direction of the reel, and a reel rotation absorbing portion is positioned adjoining to the reel in an axial direction of the reel.

23. The electric wire excess length absorbing device as set forth in claim 22, wherein a loosely winding portion, to loosely wind a fixed-side electric wire continuing from the electric wire, is provided as the reel rotation absorbing portion, and a portion to lead out the fixed-side electric wire is provided on the casing.

* * * * *